US012222725B2

(12) United States Patent
Kanayama et al.

(10) Patent No.: US 12,222,725 B2
(45) Date of Patent: Feb. 11, 2025

(54) MOVING RANGE SETTING SYSTEM AND MOVING RANGE SETTING METHOD

(71) Applicant: Hitachi, Ltd., Tokyo (JP)

(72) Inventors: Hiroki Kanayama, Tokyo (JP); Kenjiro Yamamoto, Tokyo (JP); Taishi Ueda, Tokyo (JP); Hiroshi Ito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 501 days.

(21) Appl. No.: 17/422,989

(22) PCT Filed: Nov. 18, 2019

(86) PCT No.: PCT/JP2019/045078
§ 371 (c)(1),
(2) Date: Jul. 14, 2021

(87) PCT Pub. No.: WO2020/179139
PCT Pub. Date: Sep. 10, 2020

(65) Prior Publication Data

US 2022/0075384 A1 Mar. 10, 2022

(30) Foreign Application Priority Data

Mar. 5, 2019 (JP) ................................. 2019-039483

(51) Int. Cl.
*G05D 1/02* (2020.01)
*B25J 9/16* (2006.01)
(Continued)

(52) U.S. Cl.
CPC ............ *G05D 1/0221* (2013.01); *B25J 9/163* (2013.01); *G05B 19/4155* (2013.01); *G06N 20/00* (2019.01); *G05B 2219/50391* (2013.01)

(58) Field of Classification Search
CPC .. G05D 1/0221; G05D 1/0214; G05D 1/0274; B25J 9/163; B25J 9/00;
(Continued)

(56) References Cited

U.S. PATENT DOCUMENTS 10,882,186 B1 * 1/2021 Ebrahimi Afrouzi ........................ G05D 1/0221
2007/0027579 A1 2/2007 Suzuki et al.
(Continued)

FOREIGN PATENT DOCUMENTS

JP 2006-346768 A 12/2006
JP 2017224362 A * 12/2017
(Continued)

OTHER PUBLICATIONS

International Search Report (PCT/ISA/210) issued in PCT Application No. PCT/JP2019/045078 dated Jan. 21, 2020 with English translation (five (5) pages).
(Continued)

*Primary Examiner* — Adam R Mott
*Assistant Examiner* — Byron Xavier Kasper
(74) *Attorney, Agent, or Firm* — Crowell & Moring LLP

(57) ABSTRACT

According to the present invention, a moving body capable of moving within a preset range of movement acquires an image from the environment surrounding the location of the moving body, and determines entry determination conditions for obtaining a result of an entry determination as to whether or not the moving body is allowed to enter a region identified by the location of the moving body and the image. A management terminal outputs the entry determination conditions and the image to an output device, and receives modification information relating to the entry determination conditions from an input device. A server uses the modification information received by the input device of the
(Continued)

10 management terminal to perform learning, including updating of the entry determination conditions, thereby setting the movement range of the moving body, the movement of which is controlled in accordance with the entry determination result.

8 Claims, 13 Drawing Sheets

(51) Int. Cl.
*G05B 19/4155* (2006.01)
*G05D 1/00* (2006.01)
*G06N 20/00* (2019.01)

(58) Field of Classification Search
CPC .......... B25J 9/16; B25J 9/0003; B25J 9/0081; G05B 19/4155; G05B 2219/50391; G05B 19/4061; G05B 2219/49257; G06N 20/00
See application file for complete search history.

(56) References Cited

U.S. PATENT DOCUMENTS

2012/0265391 A1* 10/2012 Letsky ................. G05D 1/0088 701/25
2018/0224862 A1 8/2018 Akazawa
2018/0252539 A1 9/2018 Yunoki et al.
2019/0176321 A1* 6/2019 Afrouzi .................. B25J 9/1666
2020/0150655 A1* 5/2020 Artes ................... G05D 1/0016
2020/0329935 A1* 10/2020 Park .................... A47L 11/4002
2020/0341479 A1* 10/2020 Kim .......................... A47L 9/28
2022/0036562 A1* 2/2022 Wu ........................... G06T 7/11

FOREIGN PATENT DOCUMENTS

JP 2018-68885 A 5/2018
JP 2018-124980 A 8/2018
RU 2620236 C1 * 5/2017 .......... A47L 11/4011
WO WO 2017/145314 A1 8/2017
WO WO-2019004621 A1 * 1/2019 .............. B25J 19/02

OTHER PUBLICATIONS

Japanese-language Written Opinion (PCT/ISA/237) issued in PCT Application No. PCT/JP2019/045078 dated Jan. 21, 2020 (three (3) pages).
Japanese-language Office Action issued in Japanese Application No. 2019-039483 dated Jun. 7, 2022 with English translation (four (4) pages).

* cited by examiner

MOVING RANGE SETTING SYSTEM AND MOVING RANGE SETTING METHOD

TECHNICAL FIELD

The present invention relates to a moving range setting system and a moving range setting method.

BACKGROUND ART

Mobile bodies such as "robots" have recently been operated in a variety of fields such as factories, hospitals, public facilities, and homes. Such a mobile body autonomously moves to transport baggage, guide a person, or engage in dangerous work, for example. Preferably, a mobile body is operated within an area pertinent to its use. Areas not pertinent to the use of a mobile body include private zones such as a toilet, dangerous areas such as a staircase and a difference in level, and others. It is required that a mobile body does not enter such an area not pertinent to the use of the mobile body.

In order to meet this requirement, for example, a technique disclosed PTL 1 has been known. PTL 1 describes that "in a case where a traveling route can be calculated by adding non-map information to a surrounding map and applying to the surrounding map first restriction information in which restrictions in setting the traveling route are set in advance, the first restriction information is applied to the surrounding map to calculate the traveling route". PTL 1 also describes that "in a case where the traveling route cannot be calculated, second restriction information that relaxes restrictions in setting the traveling route is applied to the first restriction information to calculate the traveling route, and the calculated traveling route is outputted to a traveling control module".

CITATION LIST

Patent Literature

PTL 1: WO 2017/145314 A1

SUMMARY OF INVENTION

Technical Problem

According to the technique disclosed in PTL 1, it is necessary to previously set, for every area where a mobile body possibly moves and every object in such an area, parameters regarding movement conditions such as a traveling direction, a width, and whether a mobile body can cross a lane, in a normal state and in a relaxed state. In conducting this setting work, a manager of the mobile body needs to previously grasp when and where the movement of the mobile body is restricted. In addition, the mobile body to be used every day may enter a restricted area or collide with an obstacle unless the manager conducts the setting work until the start of the use of the mobile body. However, the work which the manager previously grasps every area where the movement is restricted and the work which the manager sets the parameters require high economical or temporal cost.

The present invention has been made in view of the circumstances described above, and an object of the present invention is to facilitate setting on a moving range of a mobile body.

Solution to Problem

The present invention provides a moving range setting system for setting a moving range where a mobile body is movable, the moving range setting system including: an environment information acquisition unit configured to acquire environment information of an environment around a self-position estimated by the mobile body; an entry determination unit configured to find an entry determination condition for obtaining an entry determination result that is a result of an entry determination as to whether the mobile body is permitted to enter an area identified with the self-position and the environment information; a storage unit configured to store the entry determination condition and the environment information; an output device configured to output the entry determination condition and the environment information; an input device configured to receive corrective information regarding the entry determination condition; and a learning unit configured to perform learning that includes updating of the entry determination condition stored in the storage unit, using the corrective information received by the input device, to set the moving range of the mobile body of which the movement is controlled, in accordance with the entry determination result.

Advantageous Effects of Invention

According to the present invention, the learning that includes the updating of the entry determination condition is performed using the corrective information received by the input device. This configuration therefore facilitates setting on the moving range of the mobile body.

Other features, configurations, and advantageous effects will become obvious from the following description of embodiments.

DESCRIPTION OF EMBODIMENTS

Embodiments of the present invention will be described below with reference to the accompanying drawings. In the specification and the drawings, constituent elements that are substantially identical in function or configuration to each other are denoted with an identical reference sign for avoidance of their redundant description.

First Embodiment

<Overall Configuration Example of Moving Range Setting System>

Figure 1:
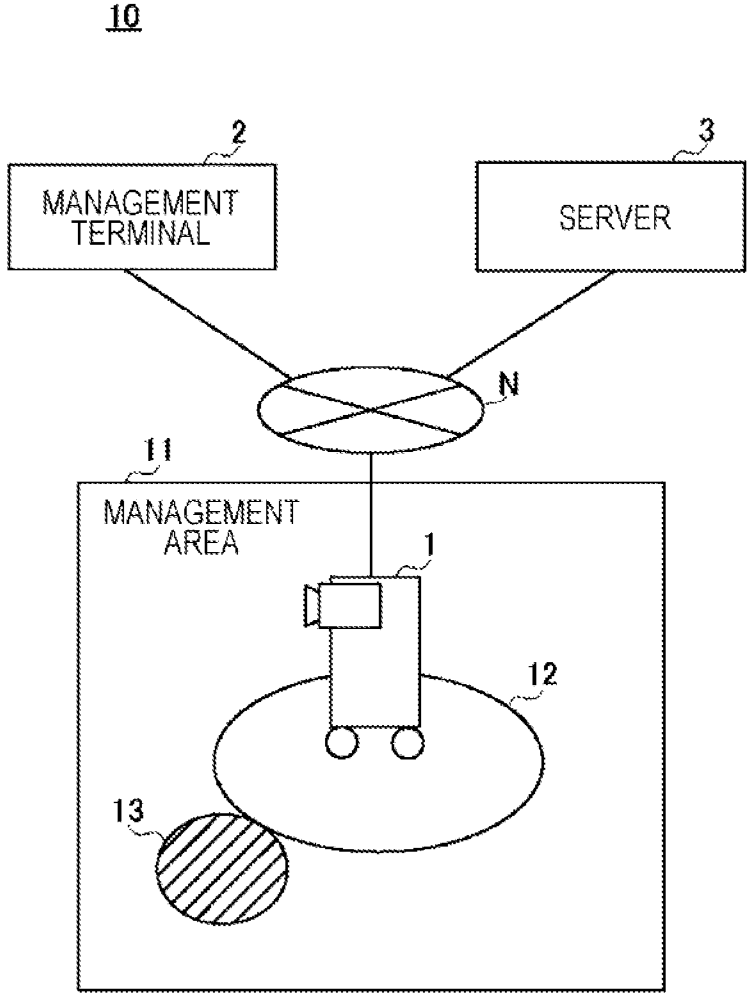
FIG. 1 is a schematic diagram that illustrates an overall configuration example of a moving range setting system according to a first embodiment of the present invention.

FIG. 1 is a schematic diagram that illustrates an overall configuration example of a moving range setting system 10.

The moving range setting system 10 includes a mobile body 1, a management terminal 2, and a server 3. By a moving range setting method according to the first embodiment, the moving range setting system 10 sets a moving range where the mobile body 1 is movable.

Each of the mobile body 1, the management terminal 2, and the server 3 is connected to a wired or wireless communication line N. The communication line N is a wired communication channel such as an electric wire or an optical fiber, or is a wireless communication channel. Communications among the mobile body 1, the management terminal 2, and the server 3 are established through the communication line N.

The mobile body 1 is an example of a robot that is movable within a preset moving range. The mobile body 1 is, for example, a guide robot that is placed in a management area 11 and is capable of autonomously guiding a person. The mobile body 1 may alternatively be, for example, a cleaning robot that cleans a floor surface or a transport robot that transports baggage. Examples of the management area 11 where the mobile body 1 is used may include, but not limited to, an office building, an airport, and a station yard. It is assumed herein that the management area 11 is located indoors; however, the management area 11 may be located outdoors, such as an inner court of a building.

In a case where the mobile body 1 is a guide robot, the mobile body 1 is capable of moving within a moving range 12 preset by the management terminal 2, and is capable of guiding a person in the moving range 12 to a destination. The management area 11 has an entry prohibited range 13 where the entry of the mobile body 1 is prohibited. Since the entry prohibited range 13 overlaps a part of the moving range 12 or the size thereof changes depending on the day, the moving range 12 is set in accordance with the entry prohibited range 13. The mobile body 1 is capable of autonomously making a determination so as not to enter the entry prohibited range 13, and is capable of moving within the moving range 12 while detouring the entry prohibited range 13.

The management terminal 2 is a terminal to be managed by a user of the mobile body 1. The user operates the management terminal 2 to initialize the management area 11, the moving range 12, and the entry prohibited range 13, to set a map of the management area 11, and to confirm various kinds of information acquired by the mobile body 1, for example.

The server 3 collects various kinds of data from the mobile body 1 and the management terminal 2, and transmits data for the use of the mobile body 1 to the mobile body 1 and the management terminal 2.

Specific configuration examples and operation examples of the mobile body 1, management terminal 2, and server 3 will be described with reference to FIG. 4 and the subsequent figures.

Next, a description will be given of a hardware configuration of a computing apparatus 4 that constitutes each equipment in the moving range setting system 10.

Figure 2:
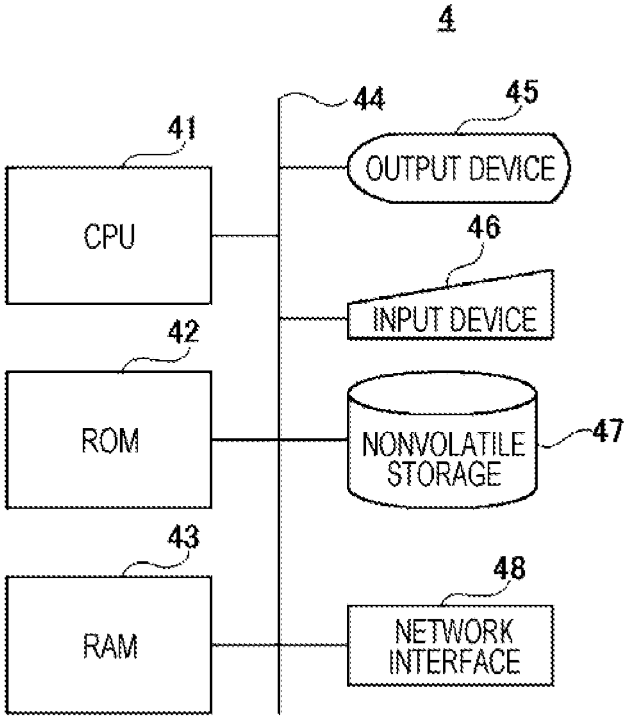
FIG. 2 is a block diagram that illustrates a hardware configuration example of a computing apparatus according to the first embodiment of the present invention.

FIG. 2 is a block diagram that illustrates a hardware configuration example of the computing apparatus 4. The computing apparatus 4 illustrated in FIG. 2 serves as hardware of each of the mobile body 1, the management terminal 2, and the server 3.

The computing apparatus 4 is hardware to be used as a "computer". The computing apparatus 4 includes a central processing unit (CPU) 41, a read only memory (ROM) 42, and a random access memory (RAM) 43 each connected to a bus 44. The computing apparatus 4 also includes an output device 45, an input device 46, a nonvolatile storage 47, and a network interface 48.

The CPU 41 reads from the ROM 42 a program code of software for implementing the respective functions according to the first embodiment, and loads the program code onto the RAM 43, thereby executing the program code. The CPU 41 temporarily writes and appropriately reads variables, parameters, and the like generated in the course of arithmetic processing, into and from the RAM 43. The output device 45 is, for example, a liquid crystal display monitor that outputs a screen for presenting, for example, a result of the processing by the computing apparatus 4 to the user. The input device 46 includes, for example, a keyboard and a mouse through which the user is able to input a predetermined operation and issue a command. It should be noted that the output device 45 and the input device 46 are not provided depending on the equipment configuration. For example, the server 3 does not necessarily include the output device 45 and the input device 46.

Examples of the nonvolatile storage 47 may include, but not limited to, a hard disk drive (HDD), a solid state drive (SSD), a flexible disk, an optical disk, a magneto-optical disk, a CD-ROM, a CD-R, a magnetic tape, and a nonvolatile memory. The nonvolatile storage 47 records therein an operating system (OS), various parameters, and a program that runs on the computing apparatus 4. Each of the ROM 42 and the nonvolatile storage 47 is an example of a computer-readable non-transitory recording medium that permanently records therein a program, data, and the like for operating the CPU 41, and stores therein a program to be executed by the computing apparatus 4.

The network interface 48 is, for example, a network interface card (NIC) that enables equipment-to-equipment data exchange through, for example, the communication line N connected to a terminal thereof.

<Outline of Processing in Moving Range Setting System>

Prior to a description on the specific configuration example of the moving range setting system 10, a description will be given of an outline of processing in the moving range setting system 10.

Figure 3:
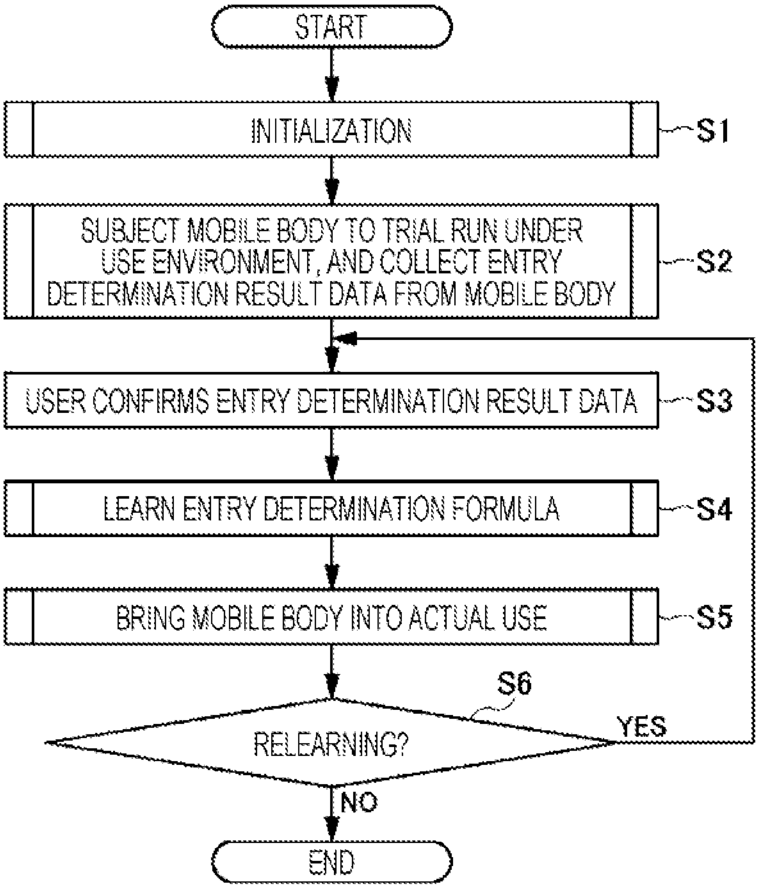
FIG. 3 is a flowchart that illustrates an outline of processing in the moving range setting system according to the first embodiment of the present invention.

FIG. 3 is a flowchart that illustrates the outline of the processing in the moving range setting system 10. FIG. 3 illustrates an example of a processing procedure in a case where the user uses the mobile body 1 of which the moving range is restricted.

First, the user operates the management terminal 2 to start initialization regarding the movement of the mobile body 1 (S1). The initialization refers to, for example, an operation of selecting an area where the mobile body 1 is usable and an area where entry of the mobile body 1 is prohibited (referred to as an "entry prohibited area") through screens illustrated in FIGS. 10 and 11 (to be described later). The details of the initialization will be described later. After the initialization, the mobile body 1 stores therein an entry determination formula constructed in accordance with the details of the initialization. The entry determination formula is, for example, a formula for obtaining entry determination result data upon reception of an image (an example of environment information) and auxiliary environment data (an example of auxiliary environment information). The entry determination result data is data on a result of an entry determination as to whether the mobile body 1 enters an area toward which the mobile body 1 moves (e.g., an area forward of the mobile body 1) and which is identified at a position where the image and the environment data are acquired. In the first embodiment, the entry determination formula is an example of an entry determination condition. The entry determination condition may be configured with a table in which an area where the mobile body 1 is movable is associated with entry permission or entry prohibition. The mobile body 1 enables autonomous movement based on a result of the determination on the entry determination formula.

Next, the management terminal 2 subjects the mobile body 1 to a trial run under a use environment, based on the initialization in step S1. At this time, the mobile body 1 collects an image and auxiliary environment data at a position estimated that the entry is prohibited, using the entry determination formula set based on the initialization (S2). The mobile body 1 then transmits a self-position estimated that the entry is prohibited, the image, and the auxiliary environment data to the management terminal 2.

Next, the management terminal 2 presents, to the user, the position of the area determined that the entry of the mobile body 1 is prohibited. An area to be determined that the entry is prohibited is not limited to, for example, a private zone such as a toilet. In order to avoid collision of the mobile body 1 with an object such as a trash box, a place of the object is also regarded as an area to be determined that the entry is prohibited.

When the management terminal 2 receives the self-position of the mobile body 1, the image, and the auxiliary environment data, the user judges whether to permit the entry of the mobile body 1 into the area presented to the management terminal 2 for use of the mobile body 1, and confirms entry determination result data derived from the entry determination formula (S3). The management terminal 2 transmits a result of the confirmation on the entry determination result data to the server 3.

Next, the server 3 collects, from the management terminal 2, the confirmation result by the user as well as an image and auxiliary environment data acquired at a position to which the mobile body 1 moves, and leans and updates the entry determination formula, using the confirmation result, the image, and the auxiliary environment data (S4). The server 3 transmits the updated entry determination formula to the mobile body 1 and the management terminal 2. Next, the management terminal 2 brings the mobile body 1 into actual use, using the entry determination formula updated by the server 3 (S5).

At the time when the mobile body 1 is used, the user judges whether to need to relearn the entry determination formula (S6). When the user judges that it is unnecessary to relearn the entry determination formula (NO in S6), this processing ends.

On the other hand, when the user judges that it is necessary to relearn the entry determination formula (YES in S6), this processing returns to step S3. The user confirms the entry determination result data, based on entry determination result data (an example of an entry determination result) newly collected during the use as well as an image and environment data acquired at a position where the entry determination is made. The server 3 relearns the entry determination formula, using the entry determination result data received from the management terminal 2. The relearning may be performed after the daily use of the mobile body 1, or may be performed when the use area of the mobile body 1 is changed due to a construction or an event.

In the moving range setting system 10 according to the first embodiment, the user is able to confirm the entry determination result data in step S3, and the entry determination formula is updatable based on corrective information and entry determination result data (an example of a confirmation result) obtained from the entry determination formula confirmed in step S4. In other words, the entry determination formula is updatable based on the corrective information indicating that the user confirms the entry determination. In the initialization, therefore, the user does not need to finely set parameters, but is only required to roughly set the movement of the mobile body 1. Next, a description will be given of a specific configuration example of each equipment in the moving range setting system 10 according to the first embodiment, with reference to FIGS. 4 to 6. In addition, a description will be given of a specific operation example of each equipment in the moving range setting system 10 according to the first embodiment, with reference to FIGS. 7 to 9. Moreover, a description will be given of display examples of screens on the management terminal 2 with reference to FIGS. 10 to 12.

<Internal Configuration Example of Mobile Body>

Figure 4:
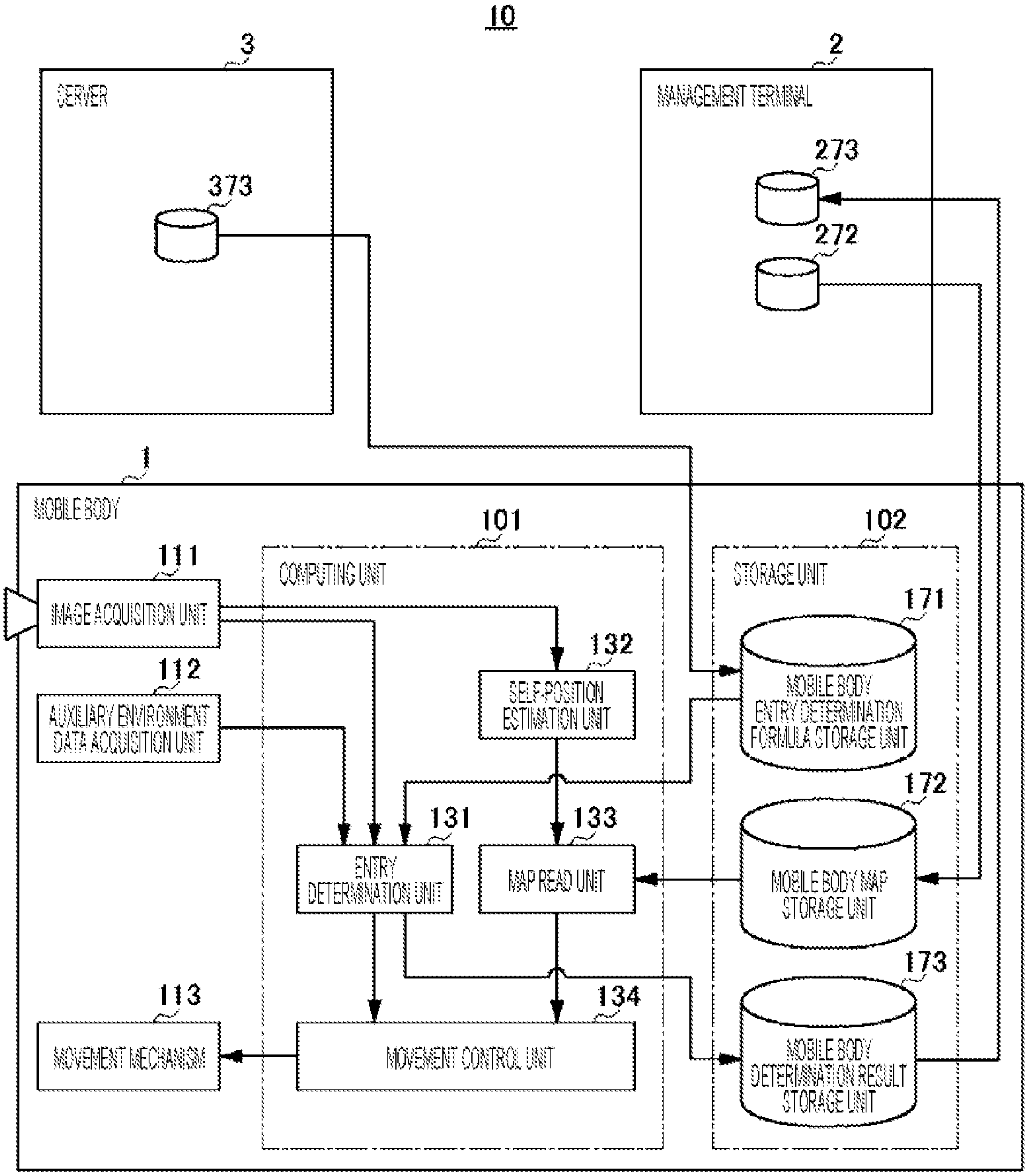
FIG. 4 is a block diagram that illustrates a specific internal configuration example of a mobile body according to the first embodiment of the present invention.

FIG. 4 is a block diagram that illustrates a specific internal configuration example of the mobile body 1. FIG. 4 illustrates an example in which one mobile body 1 is used. Alternatively, multiple mobile bodies 1 may be used as will be described later.

The mobile body 1 includes an image acquisition unit 111, an auxiliary environment data acquisition unit 112, a movement mechanism 113, a computing unit 101, and a storage unit 102.

The image acquisition unit 111 is an example of an environment information acquisition unit that is disposed in the mobile body 1 and is configured to acquire environment information of an environment around a current position of the mobile body 1 (referred to as a "self-position") estimated by the mobile body 1. The environment information is, for example, an image of an environment around the mobile body 1, the image being acquired by the image acquisition unit 111. Therefore, the image acquisition unit 111 includes one or more cameras each capable of capturing a still image or a moving image. Each camera includes an imaging device such as a charge coupled device (CCD) image sensor or a complementary metal oxide semiconductor (CMOS) image sensor. The image acquisition unit 111 is mounted in the moving direction of the mobile body 1 (e.g., on the front side of the mobile body 1). However, the image acquisition unit 111 may be mounted at any position as long as it is capable of capturing an image of an environment around the mobile body 1 at a wide angle of view. The image acquisition unit 111 outputs an image obtained by capturing an image of an environment (digital image data) to an entry determination unit 131 and a self-position estimation unit 132.

Desirably, a camera to be mounted to the mobile body 1 is fixed to the mobile body 1 such that the camera pose is fixed. However, the camera pose is not necessarily fixed in a case where the mobile body 1 or the management terminal 2 has a function of continuously grasping the camera pose.

In order that the image acquisition unit 111 acquires a wide-angle image, desirably, the mobile body 1 is equipped with a plurality of cameras as described above, or is equipped with a camera having a wide-angle lens or a super-wide-angle lens. In a case where the mobile body 1 moves about a dark place at nighttime, desirably, the mobile body 1 is equipped with an infrared camera. Also desirably, the cameras are located to evenly capture images of an environment around the mobile body 1. Also desirably, the camera having the wide-angle lens or the super-wide-angle lens is disposed at the highest position of the mobile body 1, and is directed upward on the mobile body 1. The mobile body 1 sends an image acquired by the camera as described above, to the management terminal 2. The user who operates the management terminal 2 is able to confirm the image, thereby stably confirming entry determination result data on a result of a determination by the mobile body 1.

The auxiliary environment data acquisition unit 112 (an example of an environment information acquisition unit) acquires auxiliary environment data (an example of auxiliary environment information) on an area around the mobile body 1, for substitution into the entry determination formula in conjunction with the image. The auxiliary environment data contains, for example, at least one of information on voice around the mobile body 1, information on illuminance around the mobile body 1, or information on a distance to a target object. The voice around the mobile body 1 is information which a microphone in the mobile body 1 collects at the position where the image acquisition unit 111 acquires the image. The illuminance around the mobile body 1 is information which an illuminance meter in the mobile body 1 measures at the position where the image acquisition unit 111 acquires the image. The distance to the target object is information which a distance meter in the mobile body 1 measures at the position where the image acquisition unit 111 acquires the image.

The movement mechanism 113 includes a mechanism and an actuator for the movement of the mobile body 1. The movement mechanism 113 receives a movement control signal from a movement control unit 134 to move the mobile body 1 such that the mobile body 1 follows a route autonomously determined based on the entry determination formula or to stop the mobile body 1 by applying the brake.

The computing unit 101 includes the entry determination unit 131, the self-position estimation unit 132, a map read unit 133, and the movement control unit 134. The computing unit 101 is configured with the CPU 41, the ROM 42, and the RAM 43 illustrated in FIG. 2.

The storage unit 102 (e.g., the ROM 42, the nonvolatile storage 47 in FIG. 2) of the mobile body 1 stores therein a program. This program is loaded onto the memory (e.g., the RAM 43 in FIG. 2) of the mobile body 1, and then is executed by the CPU (the CPU 41 in FIG. 2). This embodies the entry determination unit 131, the self-position estimation unit 132, the map read unit 133, and the movement control unit 134 in the computing unit 101.

The entry determination unit 131 finds an entry determination formula for obtaining entry determination result data on a result of an entry determination as to whether the mobile body 1 is permitted to enter an area to be identified with a self-position and an image acquired by the image acquisition unit 111 (e.g., an area toward which the mobile body 1 moves). At least an image is substituted as a variable into this entry determination formula, and entry determination result data is derived from this entry determination formula. The entry determination unit 131 outputs, to the movement control unit 134, entry determination result data indicating the entry permission or prohibition of the mobile body 1, the entry determination result data being obtained by substitution of the image into the entry determination formula.

In outputting the entry determination result data to the movement control unit 134, the entry determination unit 131 stores the entry determination result data and the image received from the image acquisition unit 111, in a mobile body determination result storage unit 173 of the storage unit 102. Specific processing to be executed by the entry determination unit 131 will be described later.

The case of substituting both the image and the auxiliary environment data into the entry determination formula allows the entry determination unit 131 to determine whether the mobile body 1 is located indoors or outdoors easier than the case of substituting only the image. For example, when the mobile body 1 employs the information on the voice or the information on the illuminance, the entry determination unit 131 determines whether the self-position of the mobile body 1 is located indoors or outdoors more easily. When the mobile body 1 employs the information on the distance, the entry determination unit 131 correctly makes the entry determination since the entry determination unit 131 grasps a width of a passage which the mobile body 1 moves, and a depth of a hall.

The information which the entry determination unit 131 substitutes into the entry determination formula may be current auxiliary environment data acquired by the auxiliary environment data acquisition unit 112, in addition to a current image acquired by the image acquisition unit 111. In this case, the entry determination unit 131 outputs, to the movement control unit 134, entry determination result data indicating the entry permission or prohibition of the mobile body 1, the entry determination result data being obtained by substitution of both the image and the auxiliary environment data into the entry determination formula. In outputting the entry determination result data to the movement control unit 134, the entry determination unit 131 stores the entry determination result data, the image received from the image acquisition unit 111, and the auxiliary environment data received from the auxiliary environment data acquisition unit 112, in the mobile body determination result storage unit 173.

The self-position estimation unit 132 estimates the current position of the mobile body 1 to be the self-position, based on the current image acquired by the image acquisition unit 111.

The map read unit 133 reads, from a mobile body map storage unit 172, a map on which the management terminal 2 previously sets an entry prohibited area and whish is stored in the storage unit 102. The map read unit 133 then determines where the mobile body 1 is on the map, based on the self-position estimated by the self-position estimation unit 132. The map read unit 133 compares the entry prohibited area previously set on the map with the self-position on the map to determine whether the entry prohibited area covers an area toward which the mobile body 1 moves, that is, an area forward of the mobile body 1. The map read unit 133 then outputs the entry determination result data to the movement control unit 134. The use of both the map read unit 133 and the entry determination unit 131 allows the mobile body 1 to make an entry determination more accurately than the use of only the entry determination unit 131. The user is only required to confirm the entry determination result data obtained by the trial run of the mobile body 1 (step S3 in FIG. 3). Therefore, the user does not need to select various places on the map in making an entry determination. The entry determination result data thus narrowed down is presented to the user, which enables reduction in time and effort for the user to confirm the entry determination result data.

The movement control unit 134 controls the mobile body 1 such that the mobile body 1 detours an area, where the entry of the mobile body 1 is prohibited, on the map. In a case where one of the entry determination result data received from the entry determination unit 131 and the entry determination result data received from the map read unit 133 indicates the determination that the entry of the mobile body 1 is prohibited, the movement control unit 134 controls the mobile body 1 such that the mobile body 1 follows a route detouring the entry prohibited area. Therefore, the movement control unit 134 controls the mobile body 1 such that the mobile body 1 enters the area determined that the entry of the mobile body 1 is permitted, based on the updated entry determination formula. The movement control unit 134 also controls the mobile body 1 such that the mobile body 1 detours the area determined that the entry of mobile body 1 is prohibited, based on the updated entry determination formula.

The storage unit 102 includes a mobile body entry determination formula storage unit 171, the mobile body map storage unit 172, and the mobile body determination result storage unit 173.

The mobile body entry determination formula storage unit 171 stores therein an entry determination formula to be output from the server 3 by initialization processing illustrated in FIG. 7 and learning processing illustrated in FIG. 9 as will be described later. The mobile body entry determination formula storage unit 171 appropriately acquires the entry determination formula from a server entry determination formula storage unit 373 of the server 3. The details of the entry determination formula will be described later. The mobile body entry determination formula storage unit 171 may acquire the entry determination formula at any timing, such as after the use of the mobile body 1 or after the relearning.

The mobile body map storage unit 172 stores therein a map that is previously set by the management terminal 2 and is acquired from a management terminal map storage unit 272 of the management terminal 2. The moving range of the mobile body 1 is set on the map stored in the mobile body map storage unit 172. This map may be any map as long as it establishes a correspondence relationship with a self-position estimated by the mobile body 1. Examples of the map may include a map created by simultaneous localization and mapping (SLAM) and a map to be used by a person, such as a floor map.

An area where the entry is obviously prohibited at all times irrespective of, for example, daily environmental changes is previously set by the user as an entry prohibited area on the map in the initialization processing, so that the entry prohibited area on the map may be set as an area where the entry of the mobile body 1 is prohibited. This configuration enables reduction in time for the trial run of the mobile body 1 in step S2 illustrated in FIG. 3, and also enables reduction in number of targets to be confirmed by the user in step S3 illustrated in FIG. 3. This leads to reduction in time and effort for the user to confirm the entry determination result data. It should be noted that the mobile body map storage unit 172 may acquire the map from the management terminal 2 at the time when the map is updated in the management terminal 2. The mobile body map storage unit 172 stores therein the map that is automatically transferred from the management terminal 2.

The mobile body determination result storage unit 173 temporarily stores therein the determination result data containing the image substituted into the entry determination formula used by the entry determination unit 131 and acquired at the self-position estimated by the mobile body 1, the auxiliary environment data, and the entry determination result data derived from the entry determination formula. In the determination result data, the image, the auxiliary environment data, and the entry determination result data are synchronized at the same timing and are associated with one another. The determination result data temporarily stored in the mobile body determination result storage unit 173 is copied to a management terminal determination result storage unit 273 of the management terminal 2 periodically or at the time when the server 3 performs learning.

<Internal Configuration Example of Management Terminal>

Figure 5:
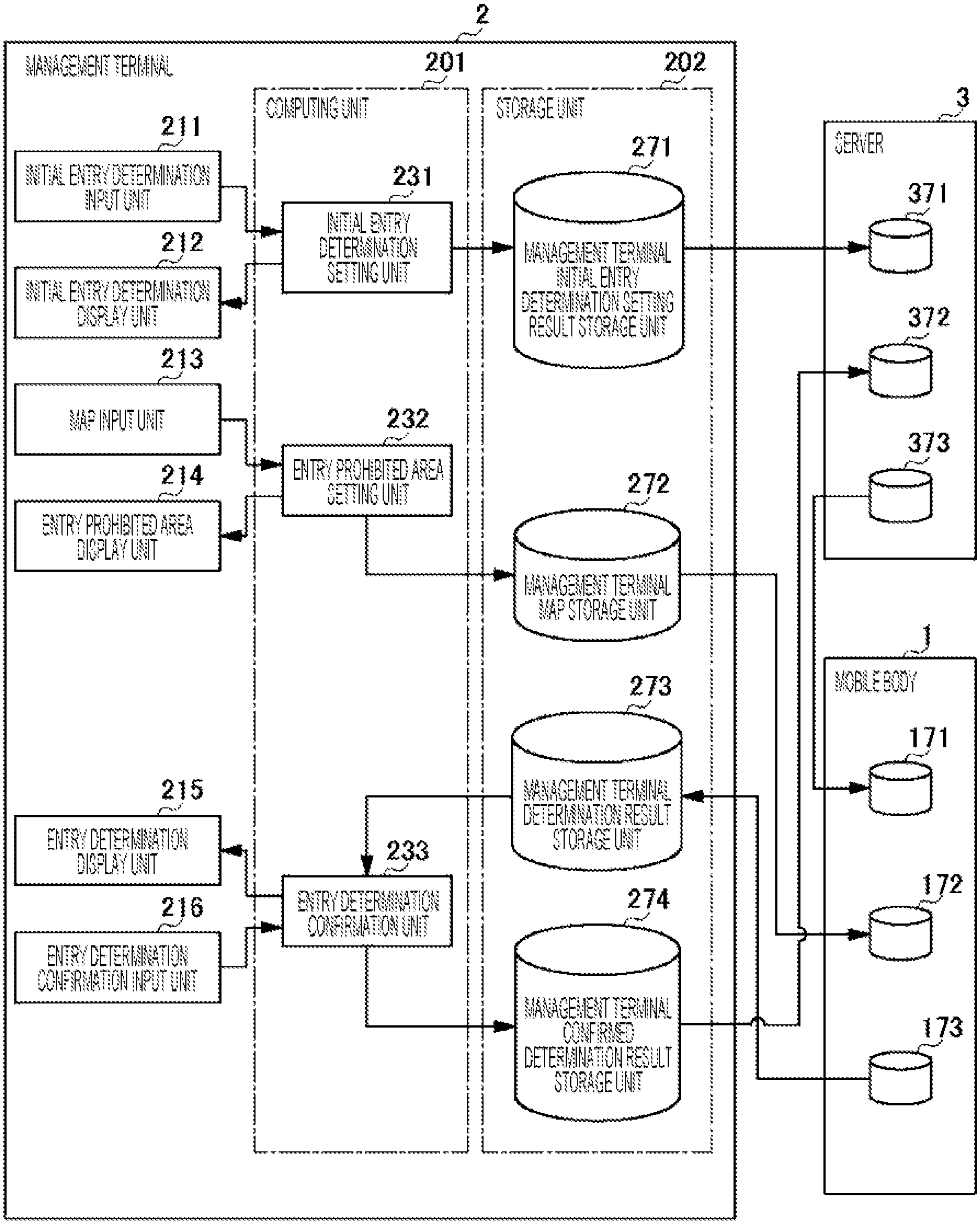
FIG. 5 is a block diagram that illustrates a specific internal configuration example of a management terminal according to the first embodiment of the present invention.

FIG. 5 is a block diagram that illustrates a specific internal configuration example of the management terminal 2.

The management terminal 2 includes an initial entry determination input unit 211, an initial entry determination display unit 212, a map input unit 213, an entry prohibited area display unit 214, an entry determination display unit 215, an entry determination confirmation input unit 216, a computing unit 201, and a storage unit 202.

The initial entry determination input unit 211, the map input unit 213, and the entry determination confirmation input unit 216 receive various kinds of information input through the input device 46 illustrated in FIG. 2. The input device 46 of the management terminal 2 is, for example, a touch screen, a keyboard, or a mouse that receives user input. The input device 46 is capable of receiving, for example, corrective information regarding an entry determination formula (an example of an entry determination condition) input by the user. The initial entry determination display unit 212, the entry prohibited area display unit 214, and the entry determination display unit 215 display various kinds of information and various screens on the output device 45 illustrated in FIG. 2. The output device 45 is capable of outputting an entry determination formula and environment information in a displayable manner.

The initial entry determination input unit 211 inputs, to the initial entry determination setting unit 231, a result of an initial entry determination which the user selects based on the details of display on the initial entry determination display unit 212, by operating the input device 46.

Figure 10:
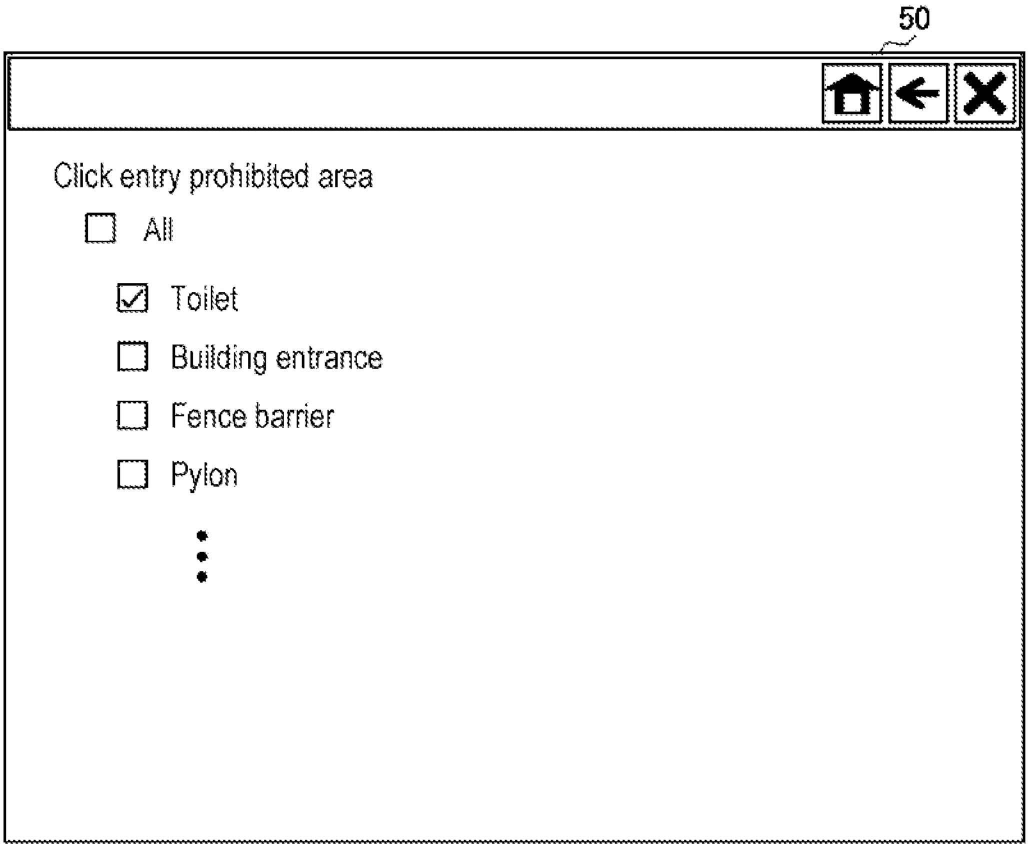
FIG. 10 is an explanatory view that illustrates a display example of an entry prohibited area setting screen according to the first embodiment of the present invention.
Figure 11:
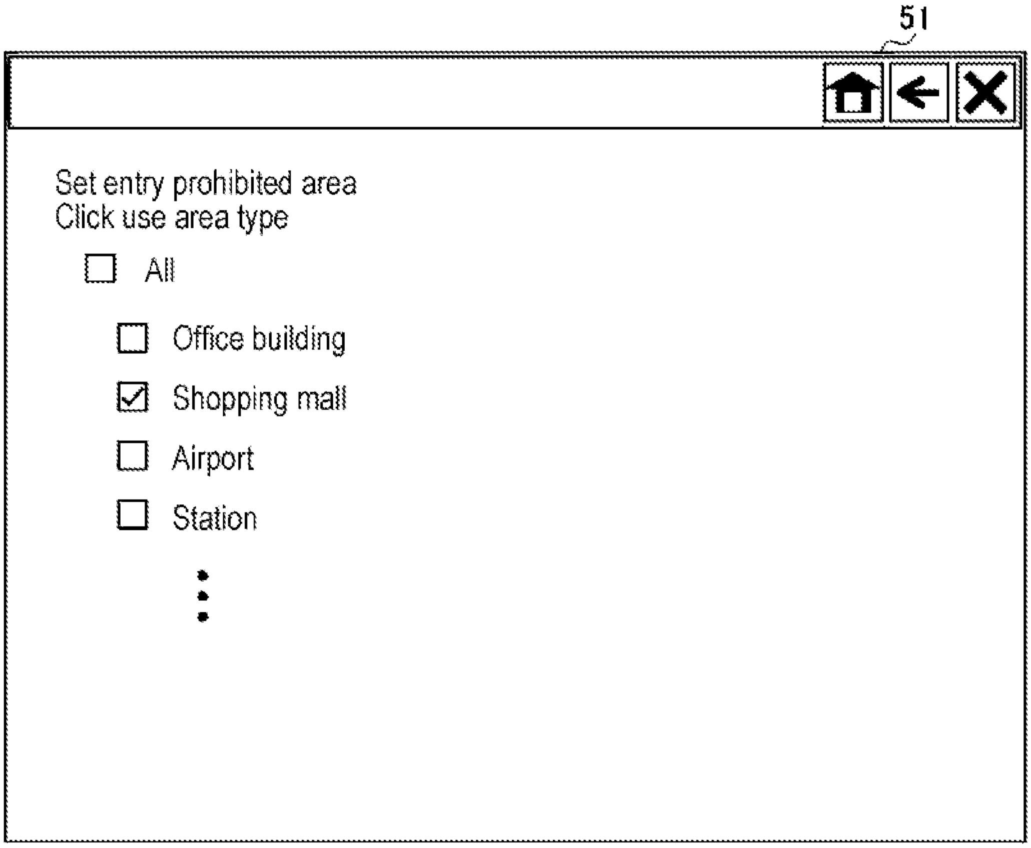
FIG. 11 is an explanatory view that illustrates a display example of a use area setting screen according to the first embodiment of the present invention.

The initial entry determination display unit 212 is, for example, the output device 45 that displays a screen for selecting the initialization regarding the movement of the mobile body 1. The screen for selecting the initialization may be a screen for setting an entry prohibited area as illustrated in FIG. 10 to be described later, or may be a screen for setting a use area of the mobile body 1 as illustrated in FIG. 11 to be described later.

The map input unit 213 receives a map to which the map read unit 133 (see FIG. 4) refers for the movement of the mobile body 1. The map input unit 213 inputs the map to the management terminal 2. The map input unit 213 may be a device that reads a map stored in an external storage device connected to the management terminal 2 and inputs the map thus stored to the management terminal 2. The map input unit 213 may alternatively be a read device, such as a scanner, that captures a map in the form of digital data.

The entry prohibited area display unit 214 displays a map received from the map input unit 213, and displays an entry prohibited area on the map. The user is able to confirm the map and the entry prohibited area displayed on the entry prohibited area display unit 214.

Figure 12:
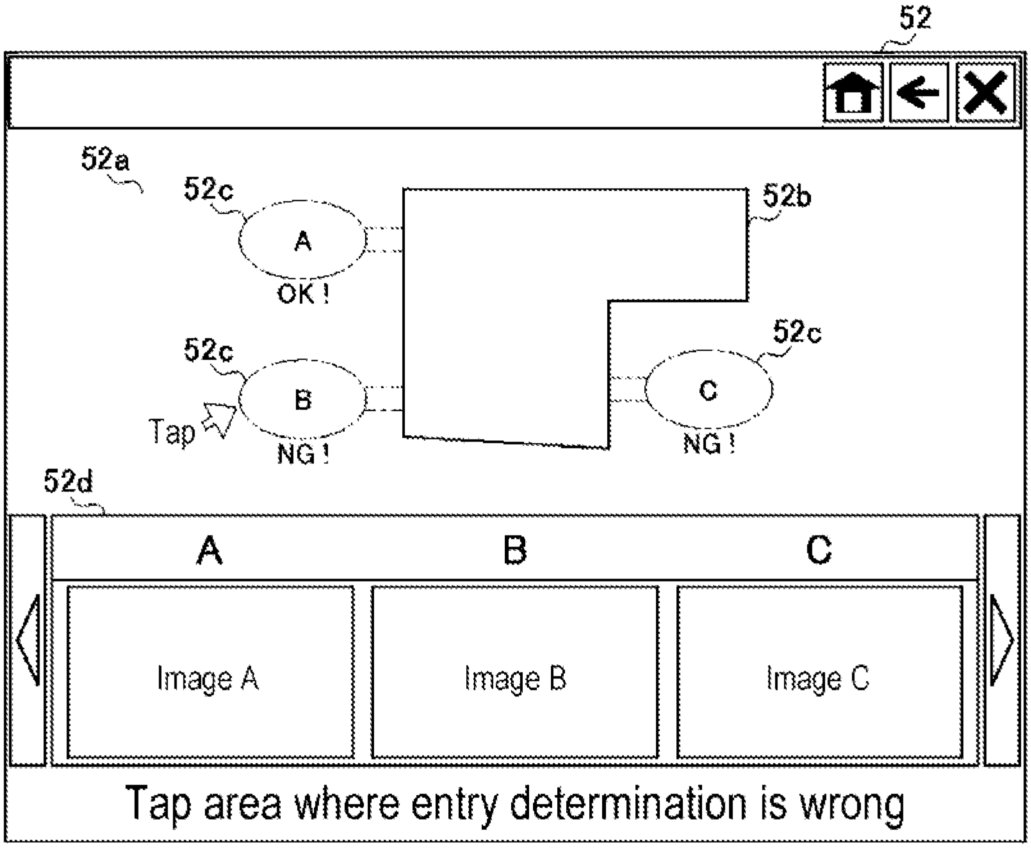
FIG. 12 is an explanatory view that illustrates a display example of an entry determination confirmation screen according to the first embodiment of the present invention.

The entry determination display unit 215 outputs entry determination result data and an image stored in the management terminal determination result storage unit 273 to the output device 45 of the management terminal 2, and causes the output device 45 to display the entry determination result data and the image on the screen. At this time, the entry determination display unit 215 outputs the map read from the management terminal determination result storage unit 273 and the entry determination result data to the output device 45, and causes the output device 45 to display the map and the entry determination result data on a management screen for managing the mobile body 1. The entry determination display unit 215 presents the position determined that the entry of the mobile body 1 is prohibited, the position being collected in step S2 illustrated in FIG. 3, to the user in order that the user confirms the entry determination result data in step S3 illustrated in FIG. 3, and thus accepts the confirmation by the user. The management screen presents, to the user, information indicating where the position determined that the entry is prohibited is. The entry determination display unit 215 is capable of presenting the map displaying thereon the position which is determined that the entry is prohibited and where the mobile body 1 does not enter, and is also capable of representing the image captured at the position, as illustrated in FIG. 12 to be described later. The user is able to confirm, on the map, the position determined that the entry is prohibited and the image, the position and image being displayed on the entry determination display unit 215.

The entry determination display unit 215 receives, from the entry determination confirmation input unit 216, corrective information that is a confirmation result of the entry determination result data, thereby displaying on the management screen the map and the entry determination result data obtained from the entry determination formula modified with the corrective information. Therefore, the user who operates the management terminal 2 easily confirms where a position corresponding to the input confirmation result is on the map.

The entry determination confirmation input unit 216 inputs, to the entry determination confirmation unit 233, a confirmation result that is a result of confirmation of the entry determination result data based on the contents displayed on the entry determination display unit 215 in such a manner that the user operates the input device 46.

The computing unit 201 includes the initial entry determination setting unit 231, an entry prohibited area setting unit 232, and the entry determination confirmation unit 233. The computing unit 201 is configured with the CPU 41, the ROM 42, and the RAM 43 illustrated in FIG. 2.

The storage unit 202 (e.g., the ROM 42, the nonvolatile storage 47 in FIG. 2) of the management terminal 2 stores therein a program. This program is loaded onto the memory (e.g., the RAM 43 in FIG. 2) of the management terminal 2, and then is executed by the CPU (the CPU 41 in FIG. 2). This embodies the initial entry determination setting unit 231, the entry prohibited area setting unit 232, and the entry determination confirmation unit 233 in the computing unit 201.

The initial entry determination setting unit 231 (an example of an initialization unit) temporarily stores a moving range initialized based on entry determination result data received through the initial entry determination input unit 211 before the use of the mobile body 1, as an initial entry determination setting result in the management terminal initial entry determination setting result storage unit 271. The initial entry determination input unit 211 of the management terminal 2 inputs an item which the initial entry determination setting unit 231 sets or selects. The item includes at least an area where the entry of the mobile body 1 is prohibited and a use area where the mobile body 1 is usable.

The initial entry determination setting result of the moving range, which is temporarily stored in the management terminal initial entry determination setting result storage unit 271, is transferred to the server 3, and then is stored in the server initial entry determination setting result storage unit 371 of the server 3.

The entry prohibited area setting unit 232 is an example of an area setting unit configured to store, in the management terminal map storage unit 272, a map on which an area input as entry prohibited area through the map input unit 213 by the user who confirms the entry prohibited area display unit 214 is set. The map, on which the entry prohibited area setting unit 232 sets the entry prohibited area, is transferred to the mobile body 1 via the management terminal map storage unit 272, and then is stored in the mobile body map storage unit 172.

The entry determination confirmation unit 233 displays, on the entry determination display unit 215, the entry determination result data received from the management terminal determination result storage unit 273. The entry determination confirmation unit 233 associates the entry determination result data with the image and the auxiliary environment data acquired at the self-position estimated by the mobile body 1, with corrective information that is a confirmation result of the entry determination result data input through the entry determination confirmation input unit 216 by the user who confirms the entry determination display unit 215. The entry determination confirmation unit 233 then stores the associated entry determination result data as confirmed entry determination result data in a management terminal confirmed determination result storage unit 274. Therefore, the management terminal confirmed determination result storage unit 274 stores therein the image, the auxiliary environment data, and the corrective information which the user inputs at the position where the image and the auxiliary environment data are acquired, in the state in which the corrective information is associated with the image and the auxiliary environment data.

The storage unit 202 includes the management terminal initial entry determination setting result storage unit 271, the management terminal map storage unit 272, the management terminal determination result storage unit 273, and the management terminal confirmed determination result storage unit 274.

The management terminal initial entry determination setting result storage unit 271 temporarily stores therein an initial entry determination setting result that is a result of initial entry an determination set by the initial entry determination setting unit 231, and transfers the initial entry determination setting result to the server 3.

The management terminal map storage unit 272 stores therein a map on which the entry prohibited area setting unit 232 sets an entry prohibited area. The management terminal map storage unit 272 automatically transfers the map to the mobile body 1 at the time when the map is updated.

The management terminal determination result storage unit 273 temporarily stores therein entry determination result data transferred from the mobile body determination result storage unit 173 of the mobile body 1. The entry determination result data is input to the entry determination confirmation unit 233 periodically or at the time when the server 3 performs learning.

The management terminal confirmed determination result storage unit 274 temporarily stores therein corrective information that is confirmed entry determination result data (an example of a confirmation result) output from the entry determination confirmation unit 233. The confirmed entry determination result data is copied to the server confirmed determination result storage unit 372 of the server 3 periodically or at the time when the server 3 performs learning. The confirmed entry determination result data is thus accumulated in the server confirmed determination result storage unit 372. The server 3 performs learning with the confirmed entry determination result data accumulated in the server confirmed determination result storage unit 372.

<Internal Configuration Example of Server>

Figure 6:
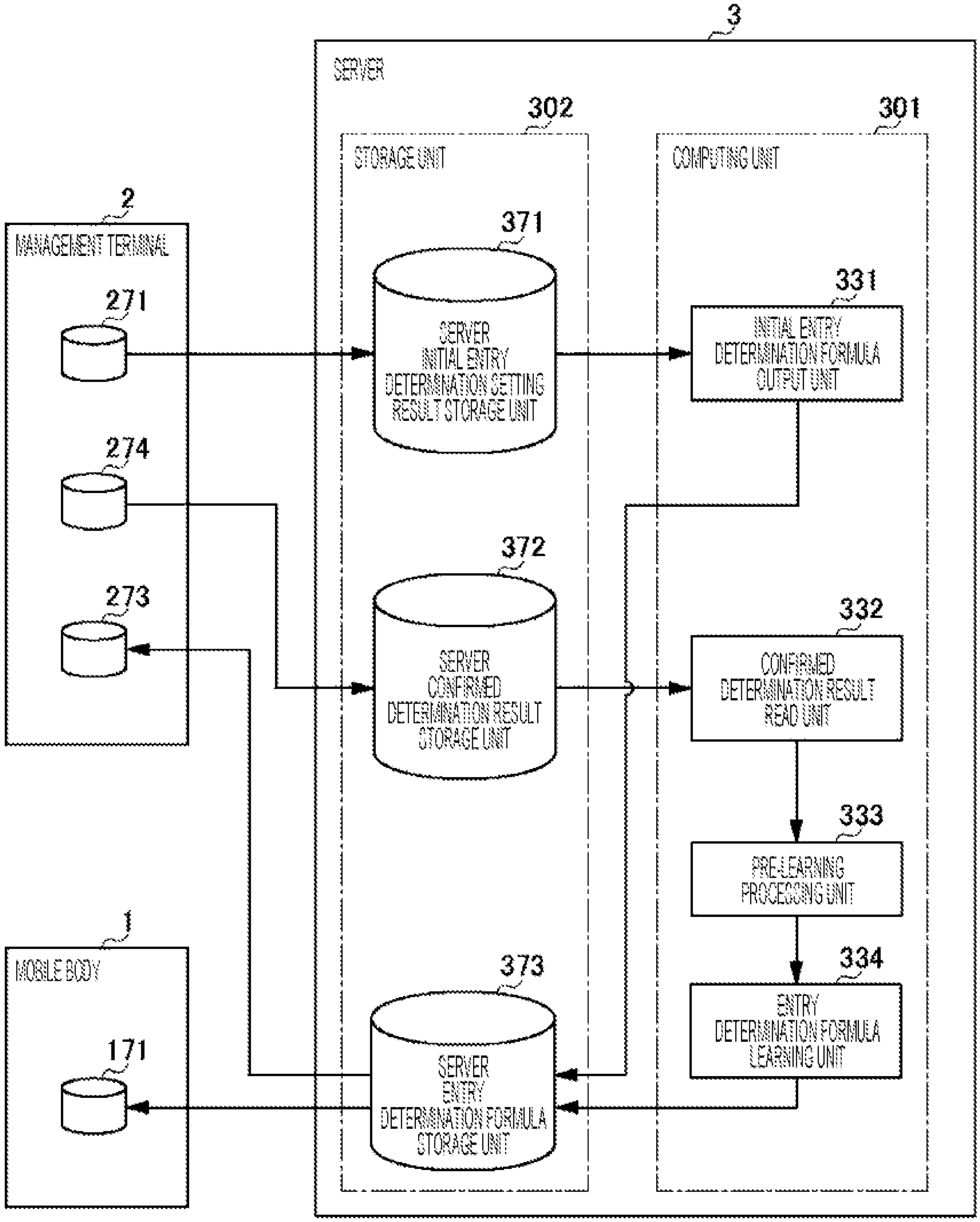
FIG. 6 is a block diagram that illustrates a specific internal configuration example of a server according to the first embodiment of the present invention.

FIG. 6 is a block diagram that illustrates a specific internal configuration example of the server 3.

The server 3 includes a computing unit 301 and a storage unit 302.

The computing unit 301 includes an initial entry determination formula output unit 331, a confirmed determination result read unit 332, a pre-learning processing unit 333, and an entry determination formula learning unit 334. The computing unit 301 is configured with the CPU 41, the ROM 42, and the RAM 43 illustrated in FIG. 2.

The storage unit 302 (e.g., the ROM 42, the nonvolatile storage 47 in FIG. 2) of the server 3 stores therein a program. This program is loaded onto the memory (e.g., the RAM 43 in FIG. 2) of the server 3, and then is executed by the CPU (the CPU 41 in FIG. 2). This embodies the initial entry determination formula output unit 331, the confirmed determination result read unit 332, the pre-learning processing unit 333, and the entry determination formula learning unit 334 in the computing unit 301.

The initial entry determination formula output unit 331 (an example of an entry determination condition setting unit) stores, in a server entry determination formula storage unit 373, an initial entry determination formula set based on an initial entry determination setting result indicating a moving range initialized by the initial entry determination setting unit 231. As illustrated in FIG. 4, the server entry determination formula storage unit 373 transfers the entry determination formula according to an initial entry determination to the mobile body entry determination formula storage unit 171 of the mobile body 1.

The initial entry determination formula output unit 331 receives the initial entry determination setting result set by the initial entry determination setting unit 231 of the management terminal 2, via the server initial entry determination setting result storage unit 371. A system developer who develops the moving range setting system 10 or the user previously collects confirmed entry determination result data. Moreover, the system developer or the user sets, for the confirmed entry determination result data, a label indicating an entry prohibited area illustrated in FIG. 10 to be described later and a label indicating a use area to which an entry prohibited area illustrated in FIG. 11 belongs. The confirmed entry determination result data for which the labels are set is previously accumulated in the server confirmed determination result storage unit 372.

Next, the initial entry determination formula output unit 331 generates an initial entry determination formula by performing learning processing with training data that is confirmed entry determination result data having a label attribute selected by initial entry determination setting, from among the multiple pieces of confirmed entry determination result data accumulated in the server confirmed determination result storage unit 372. With regard to a default initial entry determination setting result and an entry determination formula for an initial entry determination setting result to be selected frequently, learned ones are previously registered in the server entry determination formula storage unit 373. The initial entry determination formula output unit 331 may output, as an initial entry determination formula, an entry determination formula previously read from the server entry determination formula storage unit 373.

Next, a description will be given of exemplary learning processing to be previously performed by the confirmed determination result read unit 332 and the pre-learning processing unit 333 and exemplary relearning processing to be performed by the entry determination formula learning unit 334.

First, a description will be given of learning processing to be previously performed.

The confirmed determination result read unit 332 reads, from the server confirmed determination result storage unit 372, confirmed entry determination result data on a result of an entry determination confirmed by the user who operates the management terminal 2.

In order to improve entry determination formula determination accuracy, next, the pre-learning processing unit 333 performs pre-learning processing to increase confirmed entry determination result data variations. For example, the pre-learning processing unit 333 increases the data variations by performing contrast adjustment, gamma conversion, inversion, and scaling on images and performing noise addition based on the Gaussian distribution on auxiliary environment data. It should be noted that even when the pre-learning processing unit 333 subjects an image and auxiliary environment data to transformation, the corresponding entry permission/prohibition determination result does not change.

An entry determination formula refers to a formula into which an image and auxiliary environment data are substituted for deriving entry determination result data indicating whether the mobile body 1 is permitted to enter an area where the image and the auxiliary environment data are acquired, the area being located forward of the mobile body 1. Equation (1) below is an exemplary entry determination formula.

$$u=Wx+b \qquad (1)$$

In Equation (1), u represents a scalar indicating entry determination result data and taking one of a value of "0" and a value of "1". Herein, u taking the value of "0" indicates entry prohibition, and u taking the value of "1" indicates entry permission. Also in Equation (1), W represents a weight coefficient matrix of x. Also in Equation (1), x represents a vector coupling the image and the auxiliary environment data. In the following description, this vector is referred to as "environment data". Also in Equation (1), b represents a coefficient indicating a shift amount.

The learning processing in the first embodiment is processing of adjusting the coefficient matrix W and the shift amount b such that the determination result u to be derived when the environment data x is substituted is capable of outputting a more accurate determination result. As a result of the learning, the entry determination unit 131 of the mobile body 1 is capable of determining whether the mobile body 1 is permitted to enter an area located forward of the mobile body 1 and represented by the environment data x, based on the entry determination formula using the learned coefficient matrix W and shift amount b in Equation (1).

The entry determination formula learning unit 334 sets a moving range of the mobile body 1 of which the movement is controlled in accordance with the entry determination result data, by performing learning that includes updating of the entry determination formula stored in the server entry determination formula storage unit 373, using corrective information which the input device 46 receives. Therefore, the entry determination formula learning unit 334 updates the entry determination formula, based on the confirmation result confirmed through the entry determination confirmation input unit 216 of the management terminal 2, with regard to the entry determination result data obtained by the mobile body 1 from the entry determination formula into which the image and the auxiliary environment data are substituted. Next, a description will be given of entry determination formula relearning processing to be performed by the entry determination formula learning unit 334.

In performing the relearning processing, the entry determination formula learning unit 334 randomly extracts some pieces of confirmed entry determination result data.

Next, the entry determination formula learning unit 334 substitutes an initial value of the coefficient matrix W, an initial value of the shift amount b, and environment data x of each piece of the extracted data into Equation (1) to calculate an error e between u obtained from Equation (1) and an actual confirmation result u', and calculates a total value E of the errors e. The entry determination formula learning unit 334 minimally changes the coefficient matrix W and the shift amount b so as to further reduce the total value E of the errors. For example, gradient descent is usable for minimally changing the coefficient matrix W and the shift amount b. The entry determination formula learning unit 334 minimally changes the coefficient matrix W and the shift amount b for all the pieces of confirmed entry determination result data.

The entry determination formula learning unit 334 repeats the procedure described above to gradually reduce the total value E of the errors. The entry determination formula is continuously updated until a learning termination condition is satisfied. The learning termination condition includes, for example, performing by a certain time a cycle of learning processing on a group of the pieces of confirmed entry determination result data. The server entry determination formula storage unit 373 stores therein the entry determination formula into which the learned coefficient matrix W and shift amount b are substituted. Entry determination result data u to be derived from the entry determination formula thus obtained is regarded as entry determination result data optimal for the environment data x acquired at the position of the mobile body 1.

The entry determination formula learning unit 334 performs relearning processing with the confirmed entry determination result data on the result of the entry determination confirmed by the user, thereby updating the entry determination formula such that the entry determination confirmed by the user is reflected thereon.

As described above, in the initialization for the entry determination formula, the user is only required to roughly set the movement of the mobile body 1 without a necessity of fine parameter settings. Thereafter, the trial run of the mobile body 1 in step S2 illustrated in FIG. 3 and the confirmation by the user in step S3 are carried out, so that the entry determination formula is appropriately undated using the accurate entry determination result data on which the confirmation result by the user is reflected.

The storage unit 302 includes the server initial entry determination setting result storage unit 371, the server confirmed determination result storage unit 372, and the server entry determination formula storage unit 373.

The server initial entry determination setting result storage unit 371 temporarily stores therein an initial entry determination setting result that is a result of an initial entry determination set by the management terminal 2. The initial entry determination formula output unit 331 appropriately receives the initial entry determination setting result.

The server confirmed determination result storage unit 372 accumulates therein confirmed entry determination result data on a result of an entry determination confirmed by the user who operates the management terminal 2. The confirmed determination result read unit 332 receives the confirmed entry determination result data thus accumulated, at the time when the computing unit 301 performs relearning processing.

The server entry determination formula storage unit 373 stores therein an entry determination formula output from the initial entry determination formula output unit 331 and a learned entry determination formula output from the entry determination formula learning unit 334. These entry determination formulas are appropriately transferred to the mobile body 1 at, for example, the timing before the use of the mobile body 1. The server entry determination formula storage unit 373 may accumulate therein, for example, a default entry determination formula for initial entry determination setting and an entry determination formula for an initial entry determination setting result to be used frequently.

<Initialization Processing>

Figure 7:
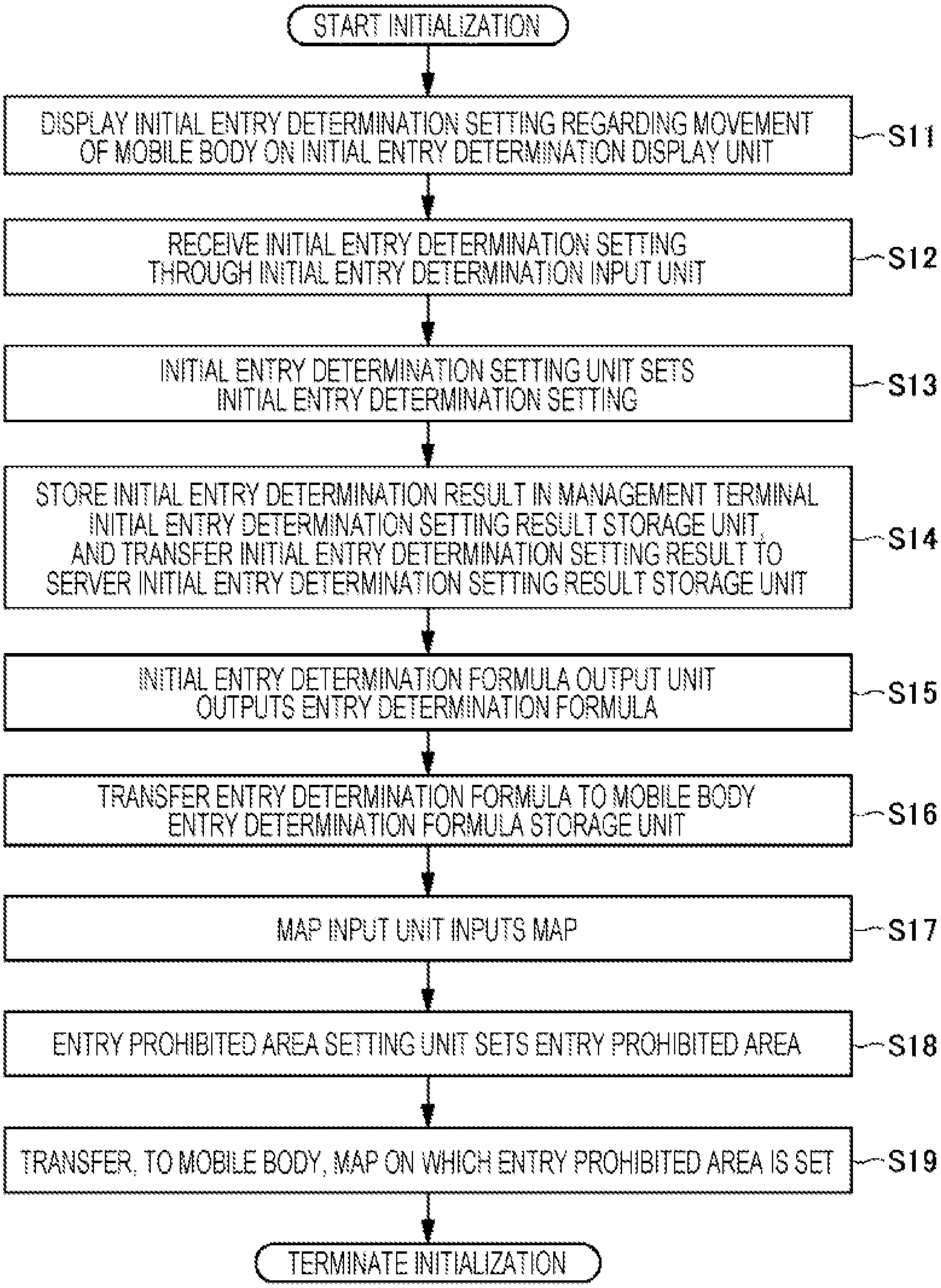
FIG. 7 is a flowchart that illustrates an example of a specific procedure of initialization processing (step S1 in FIG. 3) in the moving range setting system according to the first embodiment of the present invention.

FIG. 7 is a flowchart that illustrates an example of a specific procedure of initialization processing (step S1 in FIG. 3) in the moving range setting system 10. The initialization processing is described with reference to FIGS. 5 and 6 as appropriate.

First, the initial entry determination display unit 212 displays an initial entry determination setting regarding the movement of the mobile body 1 (S11).

The user confirms the initial entry determination setting displayed, and inputs the initial entry determination setting through the initial entry determination input unit 211 (S12). At this time, the user selects an area where the entry of the mobile body 1 is prohibited or a use area where the mobile body 1 is usable, in accordance with the use of the mobile body 1. The initial entry determination setting unit 231 sets the initial entry determination setting received, as an initial entry determination setting result (S13).

Next, the initial entry determination setting unit 231 temporarily stores the initial entry determination setting result thus set, in the management terminal initial entry determination setting result storage unit 271. At the same time, the management terminal initial entry determination setting result storage unit 271 transfers the initial entry determination setting result temporarily stored, to the server initial entry determination setting result storage unit 371 (S14).

Next, the initial entry determination formula output unit 331 of the server 3 outputs the entry determination formula according to the initial entry determination setting result transferred from the management terminal 2 to the server initial entry determination setting result storage unit 371 (S15), and temporarily stores the entry determination formula in the server entry determination formula storage unit 373. At the same time, the server entry determination formula storage unit 373 transfers the entry determination formula temporarily stored, to the mobile body entry determination formula storage unit 171 of the mobile body 1 (S16).

Next, the map input unit 213 of the management terminal 2 inputs a map (S17). The entry prohibited area setting unit 232 of the management terminal 2 sets an entry prohibited area on the map input in step S17 (S18). The map on which the entry prohibited area is set is displayed on the entry prohibited area display unit 214, and is confirmed by the user.

Next, the entry prohibited area setting unit 232 temporarily stores the map on which the entry prohibited area is set, in the management terminal map storage unit 272. At the same time, the management terminal map storage unit 272 transfers the map, which is temporarily stored and on which the entry prohibited area is set, to the mobile body map storage unit 172 of the mobile body 1 (S19).

The mobile body map storage unit 172 stores therein the map on which the entry prohibited area is set. This processing thus ends.

As described above, the initialization involves, as work to be conducted by the user, only the process of selecting the area where the entry of the mobile body 1 is prohibited or the use area, with regard to the initial determination setting in step S12 and the process of setting the entry prohibited area on the map in step S18. According to a method known in the art, it has been necessary to previously set, for every area where the mobile body 1 possibly moves and every object in such an area, parameters regarding movement conditions such as a traveling direction, a width, and whether a mobile body can cross a lane, in a normal state and in a relaxed state. The method according to the first embodiment therefore reduces time and effort for the user smaller than the conventional method.

<Movement Processing>

Figure 8:
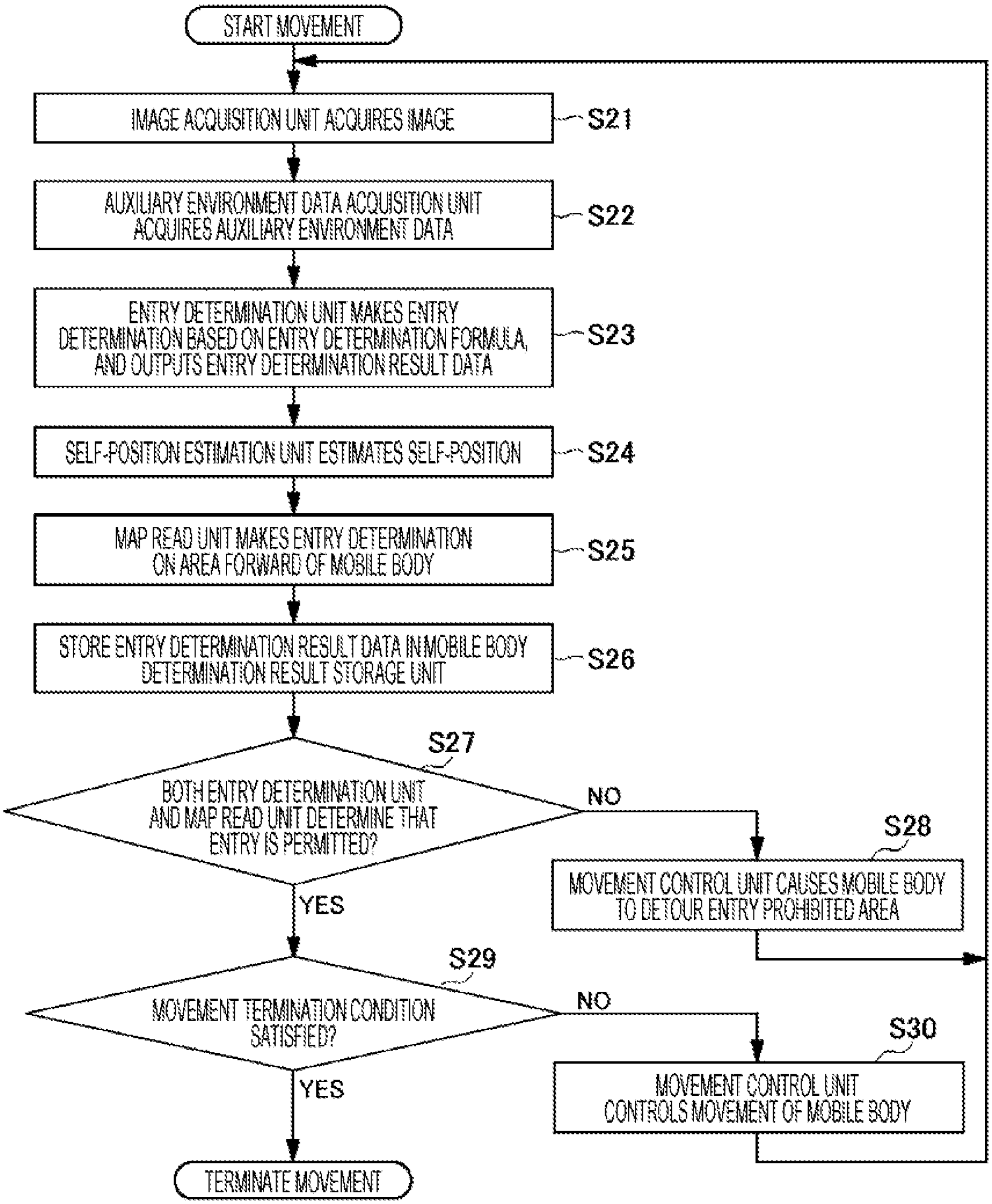
FIG. 8 is a flowchart that illustrates an example of a specific procedure of mobile body movement processing (steps S2, S5 in FIG. 3) in the moving range setting system according to the first embodiment of the present invention.

FIG. 8 is a flowchart that illustrates an example of a specific procedure of movement processing (steps S2, S5 in FIG. 3) for the mobile body 1 in the moving range setting system 10. The movement processing is described with reference to FIG. 4 as appropriate.

First, the image acquisition unit 111 of the mobile body 1 acquires an image of an area around the mobile body 1 (S21). Next, the auxiliary environment data acquisition unit 112 acquires auxiliary environment data on the environment around the mobile body 1 (S22). Next, the entry determination unit 131 substitutes the image and the auxiliary environment data into the entry determination formula to make an entry determination, and outputs entry determination result data to the movement control unit 134 (S23).

Next, the self-position estimation unit 132 estimates a self-position of the mobile body 1 that has moved based on the entry determination result data under the control by the movement control unit 134 (S24). Next, the map read unit 133 determines whether an area forward of the mobile body 1 is an entry prohibited area, based on the self-position estimated in step S24 and a positional relationship among entry prohibited areas set on the map (S25). Next, the mobile body determination result storage unit 173 stores therein the entry determination result data output in step S23 (S26).

Next, it is checked whether it is determined from each of the entry determination result data output from the entry determination unit 131 in step S23 and the entry determination result data output from the map read unit 133 in step S25 that the mobile body 1 is permitted to enter the area forward of the mobile body 1 (S27).

When it is determined from both the two pieces of entry determination result data that the entry is not permitted (NO in S27), the movement control unit 134 controls the mobile body 1 such that the mobile body 1 detours the area determined that the entry is prohibited (S28). This control avoids the entry of the mobile body 1 into the area determined that the entry is prohibited. The processing then returns to step S21, and the mobile body 1 repeats the processing.

When it is determined from both the two pieces of entry determination result data that the entry is permitted (YES in S27), the self-position estimation unit 132 checks whether to satisfy a movement termination condition for terminating the movement of the mobile body 1 (S29). When the movement termination condition is satisfied (YES in S29), the movement of the mobile body 1 is terminated.

When the movement termination condition is not satisfied (NO in S29), the movement control unit 134 moves the mobile body 1 (S30). The processing then returns to step S21, and the mobile body 1 repeats the processing.

As described above, the mobile body 1 makes the entry determination, based on the entry determination formula and the map. When it is determined that the entry is prohibited, the mobile body 1 autonomously detours the entry prohibited area as described in step S28.

<Entry Determination Formula Learning Processing>

Figure 9:
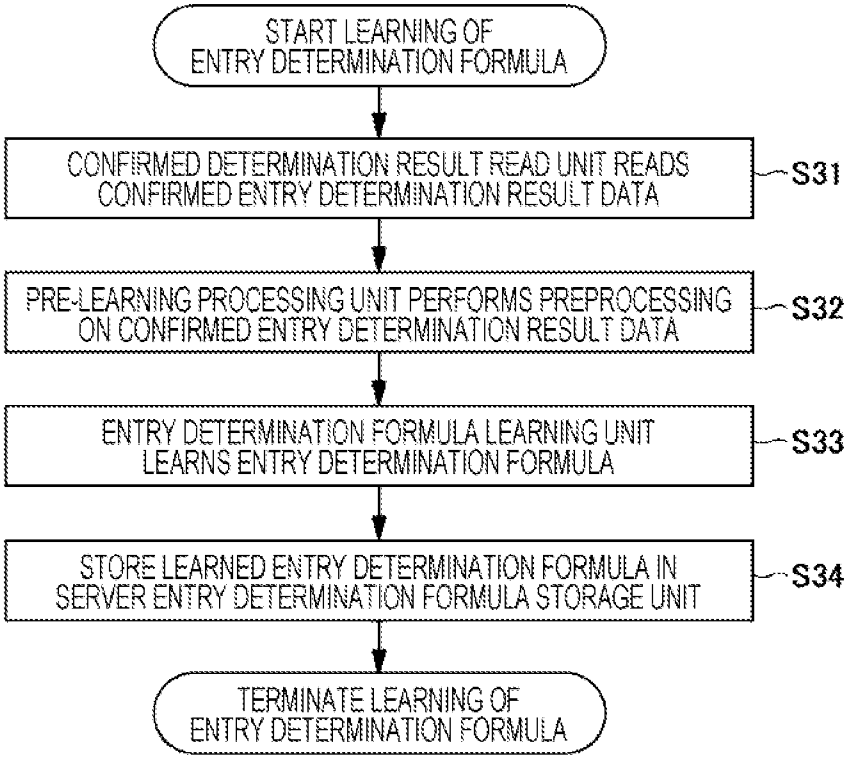
FIG. 9 is a flowchart that illustrates an example of a specific procedure of entry determination formula learning processing (step S4 in FIG. 3) in the moving range setting system according to the first embodiment of the present invention.

FIG. 9 is a flowchart that illustrates an example of a specific procedure of entry determination formula learning processing (step S4 in FIG. 3) in the moving range setting system 10. The learning processing is described with reference to FIGS. 4, 5, and 6 as appropriate.

First, the confirmed determination result read unit 332 reads confirmed entry determination result data from the server confirmed determination result storage unit 372 (S31), and outputs the confirmed entry determination result data thus read to the pre-learning processing unit 333.

Next, the pre-learning processing unit 333 performs pre-learning processing on the confirmed entry determination result data received, and increases confirmed entry determination result data variations (S32). The pre-learning processing unit 333 then outputs the confirmed entry determination result data of which the variations are increased, to the entry determination formula learning unit 334.

Next, the entry determination formula learning unit 334 learns the entry determination formula with the confirmed entry determination result data received (S33). The entry determination formula learning unit 334 then stores the learned entry determination formula learned in step S33, in the server entry determination formula storage unit 373 (S34). The learned entry determination formula stored in the server entry determination formula storage unit 373 is transmitted to the mobile body entry determination formula storage unit 171 of the mobile body 1, and the mobile body entry determination formula storage unit 171 stores therein the learned entry determination formula. The learned entry determination formula is also transmitted to the management terminal determination result storage unit 273 of the management terminal 2, and the management terminal determination result storage unit 273 stores therein the learned entry determination formula.

As described above, the entry determination formula learning processing is performed such that the confirmed entry determination result data which is the entry determination result data confirmed by the user in step S3 illustrated in FIG. 3 is reflected on the entry determination formula. The mobile body 1 is capable of accurately determining whether the moving area is an entry prohibited area, based on the entry determination formula subjected to the learning processing, thereby detouring the entry prohibited area.

<Display Examples of Screens>

With reference to FIGS. 10 to 12, next, a description will be given of the display examples of the screens on the management terminal 2.

FIG. 10 is an explanatory view that illustrates a display example of an entry prohibited area setting screen 50. The entry prohibited area setting screen 50 is an example of a screen which the initial entry determination display unit 212 displays on the output device 45 of the management terminal 2.

The user is able to previously set various areas as an entry prohibited area. Examples of the entry prohibited area may include, but limited to, a toilet, the entrance of a building, and an area partitioned with a fence barrier or a pylon. When the user clicks a check box "Toilet", the mobile body 1 is controlled so as to detour the toilet. The user clicks a check box "All" for collectively checking a plurality of check boxes.

FIG. 11 is an explanatory view that illustrates a display example of a use area setting screen 51. The use area setting screen 51 is an example of a screen which the initial entry determination display unit 212 displays on the output device 45 of the management terminal 2.

The user is able to previously set, as a use area, an area where the mobile body 1 is usable. Examples of the use area may include, but not limited to, an office building, a shopping mall, an airport, and a station. When the user clicks a check box "Office building", the mobile body 1 is controlled to move within only the office building. The user clicks a check box "All" for collectively checking a plurality of check boxes.

FIG. 12 is an explanatory view that illustrates a display example of an entry determination confirmation screen 52. The entry determination confirmation screen 52 is an example of a screen which the entry determination display unit 215 displays on the output device 45 of the management terminal 2.

The user is able to modify a confirmation result of an entry determination formula determined by the entry determination confirmation unit 233. For example, a map 52*a* is displayed on the upper side of the entry determination confirmation screen 52. On the map 52*a*, a movable area 52*b* where the mobile body 1 is movable is indicated with a solid line, and a plurality of areas 52*c* determined based on the entry determination formula are indicated with a broken line. Of the areas 52*c* determined based on the entry determination formula, an area A is determined that the entry is permitted (the area A is denoted with "OK!" in FIG. 12), and areas B and C are determined that the entry is prohibited (each of the areas B and C is denoted with "NG!" in FIG. 12).

In addition, an image display area 52*d* is displayed on the lower side of the entry determination confirmation screen 52. An image to be displayed on the image display area 52*d* is an image of an area forward of the mobile body 1, the image being acquired by the image acquisition unit 111 of the mobile body 1. The image display area 52*d* displays thereon an area name and an image which the mobile body 1 acquires from the movable area 52*b* in association with the area name. For example, the area A displays an image A which the mobile body 1 acquires from the area A. Likewise, the area B displays an image B which the mobile body 1 acquires from the area B, and the area C displays an image C which the mobile body 1 acquires from the area C.

The user determines a confirmation result of an entry determination, based on the contents displayed on the entry determination confirmation screen 52. When the entry determination is wrong, the user taps the area 52*c* displayed on the map 52*a* and determined based on the entry determination formula. With this configuration, the user is able to modify the area 52*c*, based on the correct entry determination result. For example, if it is determined that the mobile body 1 is permitted to enter the area 52*c* where the entry should be prohibited, the area 52*c* is modified such that the mobile body 1 is prohibited to enter the area 52*c*. On the contrary, if it is determined that the mobile body 1 is prohibited to enter the area 52*c* where the entry should be permitted, the area 52*c* is modified such that the mobile body 1 is permitted to enter the area 52*c*.

In the moving range setting system 10 according to the first embodiment, the management terminal 2 displays thereon an area determined as to whether the entry of the mobile body 1 is permitted, based on the entry determination formula, in accordance with the environment information acquired at the position to which the mobile body 1 has moved. The user who operates the management terminal 2 confirms the area determined as to whether the entry is permitted, and confirms the determination as to whether the entry is permitted. For example, when it is determined that the mobile body 1 is permitted to enter an area where the entry should be prohibited, the user modifies the area such that the mobile body 1 is prohibited to enter the area. The mobile body 1 is thus capable of autonomously detouring the area determined that the entry is prohibited.

In addition, the user is only required to confirm a determination on an area determined that the entry is prohibited, based on the entry determination formula. For example, a place partitioned with pylons because of, for example, a construction occasionally changes depending on the day. In such a case, the user does not need to look for an entry prohibited area or does not need to search for a material as usual. This configuration therefore lessens user's work to set an entry prohibited area. In addition, the mobile body 1 enables autonomous movement, and therefore never enters an entry prohibited area.

The user is able to confirm what place is determined that the entry is prohibited, through an image displayed on the management terminal 2, without arriving at the site. The user is therefore able to accurately make a determination as to entry prohibition.

An entry prohibited area is changeable with ease in accordance with the purpose of using the mobile body 1. For example, when the mobile body 1 is used for the purpose of guiding a guest, a toilet is set as an entry prohibited area. On the other hand, when the mobile body 1 is used for the purpose of cleaning a floor surface, a toilet is excluded from an entry prohibited area. As described above, the mobile body 1 is appropriately used by changing a moving range of the mobile body 1 in accordance with the purpose of using the mobile body 1.

Second Embodiment

The first embodiment describes the configuration example of the moving range setting system 10 including one mobile body 1. A moving range setting system may alternatively include multiple mobile bodies of different types.

Figure 13:
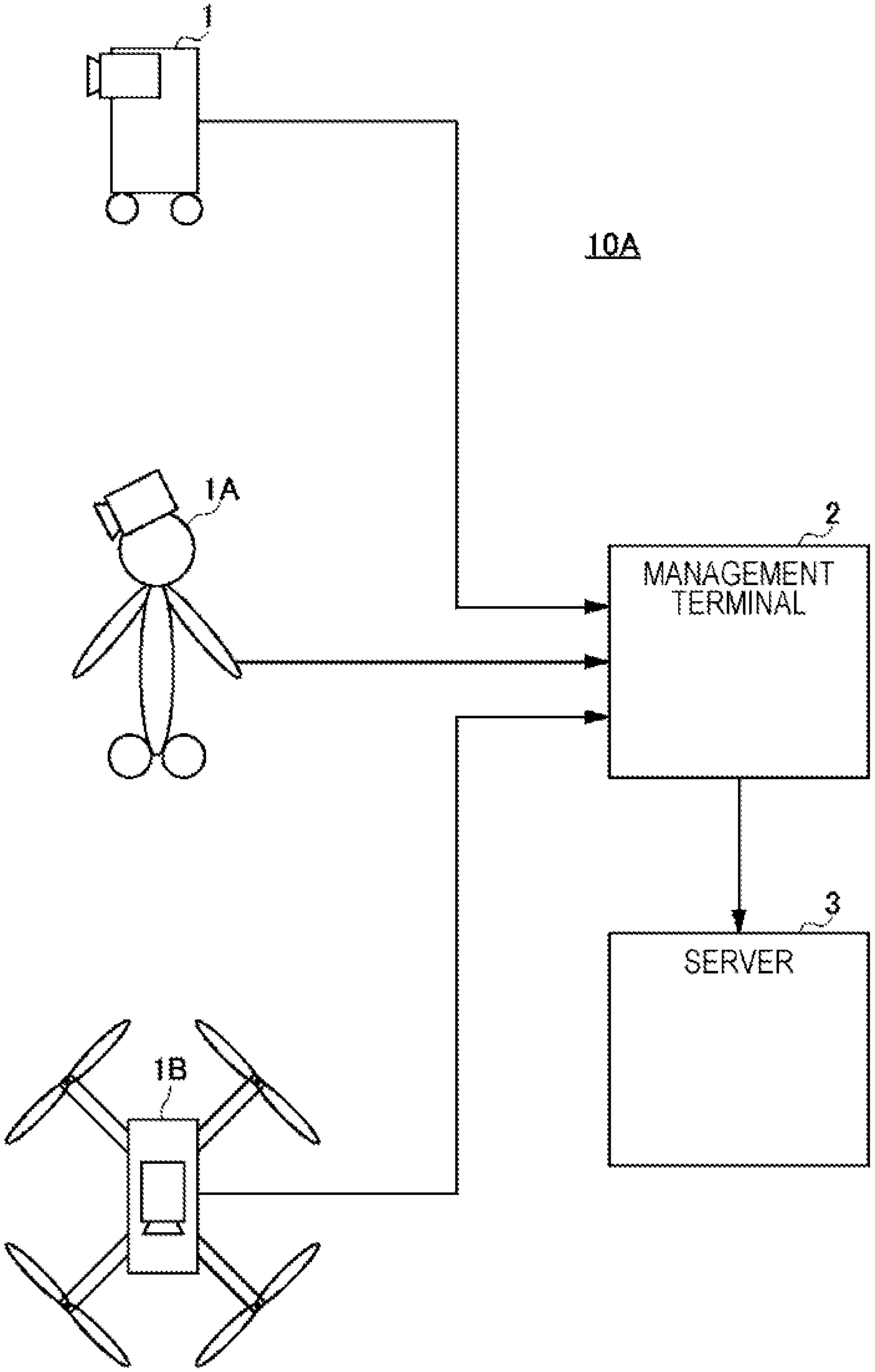
FIG. 13 is a schematic diagram that illustrates an overall configuration example of a moving range setting system including multiple mobile bodies of different types, according a second embodiment of the present invention.

FIG. 13 is a schematic diagram that illustrates an overall configuration example of a moving range setting system 10A including multiple mobile bodies of different types.

The moving range setting system 10A includes multiple mobile bodies 1, 1A, and 1B of different types. For example, the mobile body 1A is a humanoid guide robot, and the mobile body 1B is a drone that floats in the air. Each of the mobile bodies 1, 1A, and 1B is connected to a management terminal 2. The management terminal 2 collects entry determination result data from each of the mobile bodies 1, 1A, and 1B. A user confirms the entry determination result data collected, and accumulates the confirmed entry determination result data in a server 3.

The management terminal 2 is connected to the server 3. The server 3 performs learning based on the confirmed entry determination result data. The server 3 transmits an entry determination formula learned, to each of the mobile bodies 1, 1A, and 1B, so that the mobile bodies 1, 1A, and 1B enable autonomous movement.

Also in the moving range setting system 10A according to the second embodiment, the moving range of each of the mobile bodies 1, 1A, and 1B, where each of the mobile bodies 1, 1A, and 1B enables an accurate entry determination, is settable only by the simple settings on the movement of each of the mobile bodies 1, 1A, and 1B. As described above, it is unnecessary to finely set parameters for each of the mobile bodies 1, 1A, and 1B, leading to reduction in load in using the mobile bodies 1, 1A, and 1B.

Modifications

In each of the foregoing embodiments, the mobile body 1, the management terminal 2, and the server 3 are provided to have independent functions. Each equipment may alternatively have any function. For example, the mobile body 1 may perform learning processing while moving within a moving range. Alternatively, the management terminal 2 may have the function of the server 3.

An image of and auxiliary environment data on an environment around the mobile body 1 are not necessarily acquired by the image acquisition unit 111 and the auxiliary environment data acquisition unit 112 in the mobile body 1. The mobile body 1 may alternatively employ data acquired by a surveillance camera, a microphone, and the like installed in an area where the mobile body 1 is movable.

It should be noted that the present invention is not limited to the foregoing embodiments. As a matter of course, the present invention may take other various application examples and modification examples without departing from the scope of the present invention in the claims.

In the foregoing embodiments, for example, the equipment configuration and the system configuration have been specifically described for ease of understanding of the present invention; therefore, the foregoing embodiments are not necessarily limited to those having all the described configurations. In addition, a part of the configuration of one of the foregoing embodiments can be replaced the configuration of the other embodiment, and the configuration of a certain embodiment can be added to the configuration of another embodiment. A configuration of each embodiment may be partially added to, removed from, or replaced with another configuration of the embodiment.

The control lines and information lines described herein are those required for explanation; therefore, all the control lines and information lines for a product are not necessarily described. In practice, it can be considered that almost all the configurations are interconnected.

REFERENCE SIGNS LIST

- 1 mobile body
- 2 management terminal
- 3 server
- 10 moving range setting system
- 11 management area
- 12 moving range
- 13 entry prohibited range
- 111 image acquisition unit
- 112 auxiliary environment data acquisition unit
- 131 entry determination unit
- 132 self-position estimation unit
- 133 map read unit
- 134 movement control unit
- 231 initial entry determination setting unit
- 232 entry prohibited area setting unit
- 233 entry determination confirmation unit
- 334 entry determination formula learning unit

FIG. 1
- 2 MANAGEMENT TERMINAL
- 3 SERVER
- 11 MANAGEMENT AREA

FIG. 2
- 45 OUTPUT DEVICE
- 46 INPUT DEVICE
- 47 NONVOLATILE STORAGE
- 48 NETWORK INTERFACE

FIG. 3
- S1 INITIALIZATION
- S2 SUBJECT MOBILE BODY TO TRIAL RUN UNDER USE ENVIRONMENT, AND COLLECT ENTRY DETERMINATION RESULT DATA FROM MOBILE BODY
- S3 USER CONFIRMS ENTRY DETERMINATION RESULT DATA
- S4 LEARN ENTRY DETERMINATION FORMULA
- S5 BRING MOBILE BODY INTO ACTUAL USE
- S6 RELEARNING?

FIG. 4
- 1 MOBILE BODY
- 101 COMPUTING UNIT
- 102 STORAGE UNIT
- 111 IMAGE ACQUISITION UNIT
- 112 AUXILIARY ENVIRONMENT DATA ACQUISITION UNIT
- 113 MOVEMENT MECHANISM
- 131 ENTRY DETERMINATION UNIT
- 132 SELF-POSITION ESTIMATION UNIT
- 133 MAP READ UNIT
- 134 MOVEMENT CONTROL UNIT
- 171 MOBILE BODY ENTRY DETERMINATION FORMULA STORAGE UNIT
- 172 MOBILE BODY MAP STORAGE UNIT
- 173 MOBILE BODY DETERMINATION RESULT STORAGE UNIT

2 MANAGEMENT TERMINAL

3 SERVER

FIG. 5

1 MOBILE BODY

2 MANAGEMENT TERMINAL

201 COMPUTING UNIT

202 STORAGE UNIT

211 INITIAL ENTRY DETERMINATION INPUT UNIT

212 INITIAL ENTRY DETERMINATION DISPLAY UNIT

213 MAP INPUT UNIT

214 ENTRY PROHIBITED AREA DISPLAY UNIT

215 ENTRY DETERMINATION DISPLAY UNIT

216 ENTRY DETERMINATION CONFIRMATION INPUT UNIT

231 INITIAL ENTRY DETERMINATION SETTING UNIT

232 ENTRY PROHIBITED AREA SETTING UNIT

233 ENTRY DETERMINATION CONFIRMATION UNIT

271 MANAGEMENT TERMINAL INITIAL ENTRY DETERMINATION SETTING RESULT STORAGE UNIT

272 MANAGEMENT TERMINAL MAP STORAGE UNIT

273 MANAGEMENT TERMINAL DETERMINATION RESULT STORAGE UNIT

274 MANAGEMENT TERMINAL CONFIRMED DETERMINATION RESULT STORAGE UNIT

3 SERVER

FIG. 6

1 MOBILE BODY

2 MANAGEMENT TERMINAL

3 SERVER

301 COMPUTING UNIT

302 STORAGE UNIT

331 INITIAL ENTRY DETERMINATION FORMULA OUTPUT UNIT

332 CONFIRMED DETERMINATION RESULT READ UNIT

333 PRE-LEARNING PROCESSING UNIT

334 ENTRY DETERMINATION FORMULA LEARNING UNIT

371 SERVER INITIAL ENTRY DETERMINATION SETTING RESULT STORAGE UNIT

372 SERVER CONFIRMED DETERMINATION RESULT STORAGE UNIT

373 SERVER ENTRY DETERMINATION FORMULA STORAGE UNIT

FIG. 7

Start Initialization

S11 DISPLAY INITIAL ENTRY DETERMINATION SETTING REGARDING MOVEMENT OF MOBILE BODY ON INITIAL ENTRY DETERMINATION DISPLAY UNIT

S12 RECEIVE INITIAL ENTRY DETERMINATION SETTING THROUGH INITIAL ENTRY DETERMINATION INPUT UNIT

S13 INITIAL ENTRY DETERMINATION SETTING UNIT SETS INITIAL ENTRY DETERMINATION SETTING

S14 STORE INITIAL ENTRY DETERMINATION RESULT IN MANAGEMENT TERMINAL INITIAL ENTRY DETERMINATION SETTING RESULT STORAGE UNIT, AND TRANSFER INITIAL ENTRY DETERMINATION SETTING RESULT TO SERVER INITIAL ENTRY DETERMINATION SETTING RESULT STORAGE UNIT

S15 INITIAL ENTRY DETERMINATION FORMULA OUTPUT UNIT OUTPUTS ENTRY DETERMINATION FORMULA

S16 TRANSFER ENTRY DETERMINATION FORMULA TO MOBILE BODY ENTRY DETERMINATION FORMULA STORAGE UNIT

S17 MAP INPUT UNIT INPUTS MAP

S18 ENTRY PROHIBITED AREA SETTING UNIT SETS ENTRY PROHIBITED AREA

S19 TRANSFER, TO MOBILE BODY, MAP ON WHICH ENTRY PROHIBITED

AREA IS SET

Terminate Initialization

FIG. 8

Start Movement

S21 IMAGE ACQUISITION UNIT ACQUIRES IMAGE

S22 AUXILIARY ENVIRONMENT DATA ACQUISITION UNIT ACQUIRES AUXILIARY ENVIRONMENT DATA

S23 ENTRY DETERMINATION UNIT MAKES ENTRY DETERMINATION BASED ON ENTRY DETERMINATION FORMULA, AND OUTPUTS ENTRY DETERMINATION RESULT DATA

S24 SELF-POSITION ESTIMATION UNIT ESTIMATES SELF-POSITION

S25 MAP READ UNIT MAKES ENTRY DETERMINATION ON AREA FORWARD OF MOBILE BODY

S26 STORE ENTRY DETERMINATION RESULT DATA IN MOBILE BODY DETERMINATION RESULT STORAGE UNIT

S27 BOTH ENTRY DETERMINATION UNIT AND MAP READ UNIT DETERMINE THAT ENTRY IS PERMITTED?

S28 MOVEMENT CONTROL UNIT CAUSES MOBILE BODY TO DETOUR ENTRY PROHIBITED AREA

S29 MOVEMENT TERMINATION CONDITION SATISFIED?

S30 MOVEMENT CONTROL UNIT CONTROLS MOVEMENT OF MOBILE BODY

Terminate Movement

FIG. 9

Start Learning of Entry Determination Formula

S31 CONFIRMED DETERMINATION RESULT READ UNIT READS CONFIRMED ENTRY DETERMINATION RESULT DATA

S32 PRE-LEARNING PROCESSING UNIT PERFORMS PREPROCESSING ON CONFIRMED ENTRY DETERMINATION RESULT DATA

S33 ENTRY DETERMINATION FORMULA LEARNING UNIT LEARNS ENTRY DETERMINATION FORMULA

S34 STORE LEARNED ENTRY DETERMINATION FORMULA IN SERVER ENTRY DETERMINATION FORMULA STORAGE UNIT

Terminate Learning of Entry Determination Formula

FIG. 10

Click entry prohibited area

All

Toilet

Building entrance

Fence barrier

Pylon

FIG. 11
Set entry prohibited area
Click use area type
All
Office building
Shopping mall
Airport
Station
FIG. 12
Tap
Image
Tap area where entry determination is wrong
FIG. 13
2 MANAGEMENT TERMINAL
3 SERVER

The invention claimed is:

1. A moving range setting system for setting a moving range where a mobile body is movable, the moving range setting system comprising:

an environment information acquisition unit configured to acquire environment information of an environment around a self-position estimated by the mobile body;

a computing apparatus configured to:

store, in a storage unit, an initial entry determination setting result indicating the moving range of the mobile body, including an entry prohibited area where entry of the mobile body is prohibited or a first use area where the mobile body is usable;

set an initial entry determination condition by performing learning processing with training data that is confirmed entry determination result data to which a label selected by an initial entry determination setting has been set, from among confirmed entry determination result data for which a label indicating the entry prohibited area of the mobile body or a label indicating a second use area to which the entry prohibited area belongs has been set in advance, and store the initial entry determination condition in the storage unit;

input the self-position and the environment information into the initial entry determination condition and obtain an entry determination result data that is a result of an entry determination as to whether the mobile body is permitted to enter an area identified with the self-position and the environment information; and store corrective information in the storage device, in a state of being associated with the environment information acquired at the self-position;

an output device, including a display screen, configured to output the entry determination result data and the environment information, including displaying an image;

an input device, including at least one of a touch screen, a keyboard, and a mouse, configured to receive the initial entry determination setting and the corrective information regarding the initial entry determination setting result and/or the entry determination condition, wherein the initial entry determination setting is received before the use of the mobile body; and a server configured to perform learning that includes updating of the entry determination condition stored in the storage unit, using the corrective information stored in the storage unit, to set the moving range of the mobile body of which the movement is controlled, in accordance with the entry determination result;

wherein the mobile body includes a movement control unit configured to cause the mobile body to enter the area determined that the entry is permitted, based on the entry determination condition updated, and configured to cause the mobile body to detour the area determined that the entry is prohibited, based on the entry determination condition updated;

wherein the learning processing of the entry determination condition determines a plurality of variables consisting of weighting coefficients and shift quantities using iterative calculations to reduce output error to obtain a function formula which takes a plurality of variations of the environmental information including the image as input and outputs the entry determination result of determining whether or not the mobile body can be entered;

wherein the environment information acquisition unit acquires auxiliary environment information of an environment around the mobile body, the auxiliary environment information being input to the entry determination condition in conjunction with the environment information;

wherein the computing apparatus outputs, in addition to the environment information, an entry determination result that is a result of an entry determination as to whether the entry of the mobile body is permitted, the entry determination result being obtained by inputting the auxiliary environment information to the entry determination condition; and wherein the auxiliary environment information includes information on illuminance around the mobile body, the illuminance being measured by an illuminance meter in the mobile body, or information on a distance to a target object, the distance being measured by a distance meter in the mobile body, at a position where the environment information acquisition unit acquires the environment information.

2. The moving range setting system according to claim 1, further comprising:

an entry determination confirmation unit configured to associate the corrective information with the environment information acquired at the self-position estimated by the mobile body, and configured to store the corrective information associated, in the storage unit as a confirmed entry determination result.

3. The moving range setting system according to claim 1, wherein the environment information acquisition unit includes an image acquisition unit in the mobile body, the environment information includes an image around the mobile body, the image being acquired by the image acquisition unit, and the server updates the entry determination condition, based on the corrective information and the entry determination result obtained from the entry determination condition to which the image is input.

4. The moving range setting system according to claim 1, further comprising:

an area setting unit configured to store, in the storage unit, a map on which the area defined as an entry prohibited area through the input device is set, wherein the movement control unit causes the mobile body to detour the area set as the entry prohibited area on the map.

5. The moving range setting system according to claim 4, further comprising:

an entry determination display unit configured to output the map read from the storage unit and the entry determination result to the output device to cause the output device to display a management screen for managing the mobile body, and configured to, when the input device receives the corrective information, cause the output device to display, on the management screen, the map and the entry determination result obtained based on the entry determination condition modified with the corrective information.

6. The moving range setting system according to claim 1, further comprising:

an initialization unit configured to initialize the moving range before use of the mobile body; and an entry determination condition setting unit configured to set the entry determination condition, based on the moving range initialized.

7. The moving range setting system according to claim 6, wherein the input device receives an item which the initialization unit sets or selects, the item including at least an area where the entry of the mobile body is prohibited and a use area where the mobile body is usable.

8. A moving range setting method for setting a moving range where a mobile body is movable, the moving range setting method comprising:

acquiring environment information of an environment around a self-position estimated by the mobile body;

storing, in a storage unit, an initial entry determination setting result indicating the moving range of the mobile body, including an entry prohibited area where entry of the mobile body is prohibited or a first use area where the mobile body is usable;

setting an initial entry determination condition by performing learning processing with training data that is confirmed entry determination result data to which a label selected by an initial entry determination setting has been set, from among confirmed entry determination result data for which a label indicating the entry prohibited area of the mobile body or a label indicating a second use area to which the entry prohibited area belongs has been set in advance, and storing the initial entry determination condition in the storage unit;

inputting the self-position and the environment information into the initial entry determination condition and obtaining an entry determination result data that is a result of an entry determination as to whether the mobile body is permitted to enter an area identified with the self-position and the environment information;

storing the corrective information in the storage device, in a state of being associated with the environment information acquired at the self-position;

outputting the entry determination result data and the environment information to an output device, including a display screen;

receiving, by an input device including at least one of a touch screen, a keyboard, and a mouse, the initial entry determination setting and the corrective information regarding the initial entry determination setting result and the entry determination condition, wherein the initial entry determination setting is received before the use of the mobile body; and performing, by a server, learning that includes updating of the entry determination condition stored in the storage unit, using the corrective information stored in the storage unit, to set the moving range of the mobile body of which the movement is controlled, in accordance with the entry determination result;

wherein the mobile body includes a movement control unit configured to cause the mobile body to enter the area determined that the entry is permitted, based on the entry determination condition updated, and configured to cause the mobile body to detour the area determined that the entry is prohibited, based on the entry determination condition updated;

wherein the learning processing of the entry determination condition determines a plurality of variables consisting of weighting coefficients and shift quantities using iterative calculations to reduce output error to obtain a function formula which takes a plurality of variations of the environmental information including the image as input and outputs the entry determination result of determining whether or not the mobile body can be entered;

wherein the environment information acquisition unit acquires auxiliary environment information of an environment around the mobile body, the auxiliary environment information being input to the entry determination condition in conjunction with the environment information;

wherein the computing apparatus outputs, in addition to the environment information, an entry determination result that is a result of an entry determination as to whether the entry of the mobile body is permitted, the entry determination result being obtained by inputting the auxiliary environment information to the entry determination condition; and wherein the auxiliary environment information includes information on illuminance around the mobile body, the illuminance being measured by an illuminance meter in the mobile body, or information on a distance to a target object, the distance being measured by a distance meter in the mobile body, at a position where the environment information acquisition unit acquires the environment information.

* * * * *